(12) United States Patent
Long

(10) Patent No.: US 10,929,943 B2
(45) Date of Patent: Feb. 23, 2021

(54) DETECTING CONFLICTS BETWEEN MULTIPLE DIFFERENT ENCODED SIGNALS WITHIN IMAGERY

(71) Applicant: Digimarc Corporation, Beaverton, OR (US)

(72) Inventor: Scott M. Long, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 16/264,413

(22) Filed: Jan. 31, 2019

(65) Prior Publication Data

US 2019/0236748 A1    Aug. 1, 2019

Related U.S. Application Data

(63) Continuation of application No. 15/704,833, filed on Sep. 14, 2017, now Pat. No. 10,198,782.

(60) Provisional application No. 62/397,743, filed on Sep. 21, 2016, provisional application No. 62/395,282, filed on Sep. 15, 2016.

(51) Int. Cl.
| G06K 9/00 | (2006.01) |
| G06T 1/00 | (2006.01) |
| H04N 1/32 | (2006.01) |

(52) U.S. Cl.
CPC ....... *G06T 1/0064* (2013.01); *H04N 1/32149* (2013.01); *G06T 2201/0061* (2013.01); *G06T 2201/0065* (2013.01); *G06T 2201/0202* (2013.01); *G06T 2201/0601* (2013.01); *H04N 2201/3269* (2013.01)

(58) Field of Classification Search
None
See application file for complete search history.

(56) References Cited

U.S. PATENT DOCUMENTS

| 5,262,623 | A | 11/1993 | Batterman |
| 5,365,048 | A | 11/1994 | Komiya |
| 5,841,886 | A | 11/1998 | Rhoads |
| 5,859,920 | A | 1/1999 | Daly |
| 5,862,260 | A | 1/1999 | Rhoads |
| 5,949,885 | A | 9/1999 | Leighton |
| 6,122,403 | A | 9/2000 | Rhoads |
| 6,175,627 | B1 | 1/2001 | Petrovic |
| 6,208,735 | B1 | 3/2001 | Cox |
| 6,246,775 | B1 | 6/2001 | Nakamura |

(Continued)

FOREIGN PATENT DOCUMENTS

WO    2013033442 A1    3/2013

OTHER PUBLICATIONS

US 9,438,765 B2, 09/2016, Holub (withdrawn)

(Continued)

*Primary Examiner* — Nancy Bitar
(74) *Attorney, Agent, or Firm* — Digimarc Corporation

(57) ABSTRACT

Various image processing arrangements are detailed for detecting mis-marking of product packaging artwork with two conflicting steganographically-encoded product identifiers. Some embodiments concern detection in a pre-press or test-print quality assurance stage. Others concern detection post-press. All help serve to assure accurate product identification by point of sale scanners. A great number of other features and arrangements are also detailed.

18 Claims, 23 Drawing Sheets

(56) References Cited

U.S. PATENT DOCUMENTS

| | | |
|---|---|---|
| 6,307,949 B1 | 10/2001 | Rhoads |
| 6,343,138 B1 | 1/2002 | Rhoads |
| 6,345,104 B1 | 2/2002 | Rhoads |
| 6,408,082 B1 | 6/2002 | Rhoads |
| 6,449,377 B1 | 9/2002 | Rhoads |
| 6,463,416 B1 | 10/2002 | Messina |
| 6,523,741 B1 | 2/2003 | DiMaria |
| 6,590,996 B1 | 7/2003 | Reed |
| 6,614,914 B1 | 9/2003 | Rhoads |
| 6,625,297 B1 | 9/2003 | Bradley |
| 6,687,385 B1 | 2/2004 | Handley |
| 6,698,658 B2 | 3/2004 | McQueen |
| 6,704,869 B2 | 3/2004 | Rhoads |
| 6,718,046 B2 | 4/2004 | Reed |
| 6,738,495 B2 | 5/2004 | Rhoads |
| 6,763,123 B2 | 7/2004 | Reed |
| 6,843,422 B2 | 1/2005 | Jones |
| 6,891,959 B2 | 5/2005 | Reed |
| 6,912,295 B2 | 6/2005 | Reed |
| 6,947,571 B1 | 9/2005 | Rhoads |
| 6,993,154 B2 | 1/2006 | Brunk |
| 7,006,662 B2 | 2/2006 | Alattar |
| 7,013,021 B2 | 3/2006 | Sharma |
| 7,016,516 B2 | 3/2006 | Rhoads |
| 7,043,052 B2 | 5/2006 | Rhoads |
| 7,044,395 B1 | 5/2006 | Davis |
| 7,046,819 B2 | 5/2006 | Sharma |
| 7,054,461 B2 | 5/2006 | Zeller |
| 7,058,200 B2 | 6/2006 | Donescu |
| 7,085,396 B2 | 8/2006 | Pelly |
| 7,113,596 B2 | 9/2006 | Rhoads |
| 7,116,781 B2 | 10/2006 | Rhoads |
| 7,130,442 B2 | 10/2006 | Braudaway |
| 7,158,654 B2 | 1/2007 | Rhoads |
| 7,213,757 B2 | 5/2007 | Jones |
| 7,231,061 B2 | 6/2007 | Bradley |
| 7,263,203 B2 | 8/2007 | Rhoads |
| 7,286,685 B2 | 10/2007 | Brunk |
| 7,330,563 B2 | 2/2008 | Rhoads |
| 7,349,555 B2 | 3/2008 | Rhoads |
| 7,352,878 B2 | 4/2008 | Reed |
| 7,369,678 B2 | 5/2008 | Rhoads |
| 7,370,190 B2 | 5/2008 | Calhoon |
| 7,478,067 B2 | 1/2009 | Messina |
| 7,602,977 B2 | 10/2009 | Rhoads |
| 7,607,016 B2 | 10/2009 | Brunk |
| 7,657,058 B2 | 2/2010 | Sharma |
| 7,724,920 B2 | 5/2010 | Rhoads |
| 7,762,468 B2 | 7/2010 | Jones |
| 7,796,826 B2 | 9/2010 | Rhoads |
| 7,856,116 B2 | 12/2010 | Rodriguez |
| 7,986,807 B2 | 7/2011 | Stach |
| 8,051,295 B2 | 11/2011 | Brunk |
| 8,059,858 B2 | 11/2011 | Brundage |
| 8,123,134 B2 | 2/2012 | Reed |
| 8,127,137 B2 | 2/2012 | Levy |
| 8,194,919 B2 | 6/2012 | Rodriguez |
| 8,243,980 B2 | 8/2012 | Rhoads |
| 8,245,926 B2 | 8/2012 | Guess |
| 8,301,893 B2 | 10/2012 | Brundage |
| 8,321,350 B2 | 11/2012 | Durst |
| 8,411,898 B2 | 4/2013 | Rhoads |
| 8,438,395 B2 | 5/2013 | Andelin |
| 8,473,209 B2 | 6/2013 | Nielsen |
| 8,543,823 B2 | 9/2013 | Carr |
| 9,008,192 B2 | 4/2015 | Rhoads |
| 9,087,376 B2 | 7/2015 | Rodriguez |
| 9,117,268 B2 | 8/2015 | Reed |
| 9,224,184 B2 | 12/2015 | Bai |
| 9,380,186 B2 | 6/2016 | Reed |
| 9,521,291 B2 | 12/2016 | Holub |
| 9,635,378 B2 | 4/2017 | Holub |
| 9,690,967 B1 | 6/2017 | Brundage |
| 9,716,807 B2 | 7/2017 | Holub |
| 9,727,941 B1 | 8/2017 | Falkenstern |
| 9,754,341 B2 | 9/2017 | Falkenstern |
| 9,892,478 B2* | 2/2018 | Calhoon .............. G06T 1/0092 |
| 10,078,878 B2 | 9/2018 | Bai |
| 10,198,782 B1* | 2/2019 | Bradley .............. G06T 1/0064 |
| 10,262,176 B1* | 4/2019 | Powell ............ G06K 19/06028 |
| 2002/0009208 A1 | 1/2002 | Alattar |
| 2002/0054355 A1 | 5/2002 | Brunk |
| 2002/0157005 A1 | 10/2002 | Brunk |
| 2003/0002710 A1 | 1/2003 | Rhoads |
| 2003/0025423 A1 | 2/2003 | Miller |
| 2003/0033530 A1 | 2/2003 | Sharma |
| 2003/0147549 A1* | 8/2003 | Choi ................ H04N 1/32203 382/100 |
| 2003/0149879 A1 | 8/2003 | Tian |
| 2004/0001608 A1 | 1/2004 | Rhoads |
| 2004/0079804 A1 | 4/2004 | Harding |
| 2004/0181671 A1* | 9/2004 | Brundage ............ H04L 9/3231 713/176 |
| 2004/0263911 A1 | 12/2004 | Rodriguez |
| 2005/0157907 A1 | 7/2005 | Reed |
| 2008/0025554 A1 | 1/2008 | Landwehr |
| 2008/0149724 A1* | 6/2008 | Nishizawa ............... G06K 1/18 235/462.11 |
| 2009/0060331 A1 | 3/2009 | Liu |
| 2009/0206161 A1 | 8/2009 | Olmstead |
| 2010/0123005 A1 | 5/2010 | Guess |
| 2010/0142003 A1 | 6/2010 | Braun |
| 2012/0000983 A1 | 1/2012 | Bhagwan |
| 2012/0104097 A1 | 5/2012 | Moran |
| 2013/0001290 A1* | 1/2013 | Trajkovic ............. G07G 1/0063 235/375 |
| 2013/0206839 A1 | 8/2013 | Gao |
| 2013/0223673 A1 | 8/2013 | Davis |
| 2013/0230239 A1* | 9/2013 | Feris ..................... G06T 7/136 382/164 |
| 2013/0329006 A1 | 12/2013 | Boles |
| 2013/0336525 A1 | 12/2013 | Kurtz |
| 2014/0021260 A1 | 1/2014 | Cherry |
| 2014/0027516 A1* | 1/2014 | Fushiki ................ G06K 7/1408 235/462.04 |
| 2014/0052555 A1 | 2/2014 | MacIntosh |
| 2014/0112524 A1 | 4/2014 | Bai |
| 2014/0258110 A1 | 9/2014 | Davis |
| 2014/0343719 A1 | 11/2014 | Collombet |
| 2015/0006672 A1 | 1/2015 | Morel |
| 2015/0030201 A1 | 1/2015 | Holub |
| 2015/0097032 A1* | 4/2015 | Olmstead ............ G07G 1/0045 235/440 |
| 2015/0156369 A1 | 6/2015 | Reed |
| 2015/0187039 A1 | 7/2015 | Reed |
| 2015/0199581 A1* | 7/2015 | Zhang ..................... G06K 9/50 382/182 |
| 2015/0287156 A1* | 10/2015 | Mai ...................... G06T 1/005 382/100 |
| 2015/0302543 A1 | 10/2015 | Weaver |
| 2016/0105585 A1 | 4/2016 | Holub |
| 2016/0267620 A1* | 9/2016 | Calhoon .............. G06T 1/0092 |
| 2016/0275639 A1 | 9/2016 | Holub |
| 2016/0364623 A1 | 12/2016 | Evans |
| 2017/0004597 A1 | 1/2017 | Boles |
| 2017/0177656 A1 | 6/2017 | Johnson |
| 2018/0157883 A1 | 6/2018 | Cumoli |
| 2018/0157887 A1 | 6/2018 | D'Ercoli |
| 2018/0157888 A1 | 6/2018 | D'Ercoli |
| 2018/0157931 A1 | 6/2018 | D'Ercoli |

OTHER PUBLICATIONS

Assignee's U.S. Appl. No. 14/725,399, filed May 29, 2015, including filing receipt. 74 pgs.

Assignee's U.S. Appl. No. 15/063,381, filed Mar. 7, 2016, including filing receipt. 51 pgs.

Assignee's U.S. Appl. No. 15/154,529, filed May 13, 2016, including filing receipt. 90 pgs.

Avcibas, et al., 'Steganalysis of Watermarking Techniques Using Images Quality Metrics', Proceedings of SPIE, Jan. 2001, vol. 4314, pp. 523-531.

(56) References Cited

OTHER PUBLICATIONS

Chih-Chung Chang and Chih-Jen Lin,, 'LIBSVM: A Library for Support Vector Machines,' ACM Transactions on Intelligent Systems and Technology, vol. 2, No. 3, Article 27, Publication date: Apr. 2011. 27 pgs.

Dautzenberg, 'Watermarking Images,' Department of Microelectronics and Electrical Engineering, Trinity College Dublin, 47 pages, Oct. 1994.

Del Colle et al. "DWT based Digital Watermarking Fidelity and Robustness Evaluation", Apr. 2008, Journal of Computer Science and Technology, vol. 8, No. 1, p. 1-6.

Dot Product article, Wikipedia, Mar. 30, 2015. 8 pgs.

Fan, et al., 'LIBLINEAR: A Library for Large Linear Classification,' Journal of Machine Learning Research 9 (2008) 1871-1874.

Feb. 8, 2017 Amendment in assignee's U.S. Appl. No. 14/881,448 (published as US 2016-0105585 Al). 14 pgs.

Fridrich, Kodovsk & Holub, 'Steganalysis of Content-Adaptive Steganography in Spatial Domain,' Information Hiding, vol. 6958 of the series Lecture Notes in Computer Science pp. 102-117, 2011.

GS1 2D Barcode Verification Process Implementation Guideline: developed with the intention of providing a clear explanation on the practical implications of 2D Barcode Verification within the GS1 System. Release 1.3.21, Ratified, Jul. 2015. 40 pgs.

GS1 Bar Code Verification for Linear Symbols, Version 4.3, May 2009. 69 pgs.

Hernandez et al., 'Statistical Analysis of Watermarking Schemes for Copyright Protection of Images,' Proceedings of the IEEE, vol. 87, No. 7, Jul. 1999. 22 pgs.

Holub & Fridrich, 'Digital image steganography using universal distortion,' IH&MMSec '13 Proceedings of the first ACM workshop on Information hiding and multimedia security, pp. 59-68 (2013).

International Standard: ISO/IEC15415, 2nd ed. Dec. 15, 2011, "Information technology—Automatic identification and data capture techniques—Bar code symbol print quality test specification—Two-dimensional symbols". 52 pages.

J. Fridrich and J. Kodovsk , 'Rich models for steganalysis of digital images,' IEEE Trans. on Information Forensics and Security, 7(3):868-882, Jun. 2012.

J. Kodovsk , J. Fridrich, and V. Holub, 'Ensemble classifiers for steganalysis of digital media,' IEEE Trans. on Inform. Forensics and Security, 7(2):432-444, Apr. 2012.

Jan. 12, 2017 non-final Office Action; dated Jan. 13, 2017 Amendment; dated Mar. 15, 2017 Notice of Allowance; dated May 12, 2017 Amendment after Allowance; all from assignee's U.S. Appl. No. 15/154,572. 46 pgs.

Knill, Lecture 12: Correlation, Math 19b: Linear Algebra with Probability, Harvard, 2011. 2 pgs.

Kodovsk , Fridrich & Holub, 'On dangers of overtraining steganography to incomplete cover model,' MM&Sec '11 Proceedings of the thirteenth ACM multimedia workshop on Multimedia and security, pp. 69-76 (2011).

Kutter, 'Watermarking Resisting to Translation, Rotation and Scaling,' Proc. of SPIE: Multimedia Systems and Applications, vol. 3528, pp. 423-431, Boston, Nov. 1998.

Lin et al., 'Rotation, Scale, and Translation Resilient Watermarking for Images,' IEEE Transactions on Image Pro62/803,341cessing, vol. 10, No. 5, May 2001, pp. 767-782.

May 19, 2017 Response to Amendment under Rule 312; dated May 12, 2017 Amendment after Notice of Allowance; dated Mar. 15, 2017 Notice of Allowance; dated Jan. 12, 2017 non-final Office Action; and dated Jan. 13, 2017 Amendment, all from assignee's U.S. Appl. No. 15/154,572. 48 pgs.

Nguyen et al. "Perceptual watermarking robust to JPEG compression attack", May 2012, IEEE, Proceedings of the 5th Int. Symposium on Communications, Control and Signal Processing 2012, p. 1-4.

Nikolaidis and Pitas., 'Region-based Image Watermarking,' IEEE Transactions on Image Processing, vol. 10, No. 11, Nov. 2001, pp. 1726-1740.

Nikolaidis et al., 'Region-Based Image Watermarking,' IEEE Transactions on Image Processing, vol. 10, No. 11, Nov. 2001, pp. 1726-1740.

O'Ruanaidh et al., 'Rotation, Scale and Translation Invariant Digital Image Watermarking,' Int. Conf. on Image Proc., Oct. 1997, IEEE, pp. 536-539.

O'Ruanaidh et al., 'Rotation, Scale and Translation Invariant Spread Spectrum Digital Image Watermarking,' Signal Processing 66, May 1, 1998, pp. 303-317.

O'Ruanaidh, 'Rotation, Scale and Translation Invariant Digital Image Watermarking,' Signal Processing, pp. 2-15, May 1, 1998.

Oct. 14, 2016 Preliminary Amendment, and dated Jan. 27, 2017 non-final Office Action; all from assignee's U.S. Appl. No. 14/881,448 (published as US 2016-0105585 Al). 17 pgs.

Pereira et al., 'Template Based Recovery of Fourier-Based Watermarks Using Log-Polar and Log-log Maps,' Proc. IEEE Int. Conf. on Multimedia Computing and Systems, vol. 1, Jun. 1999, pp. 870-874.

Pevny , P. Bas, and J. Fridrich, 'Steganalysis by subtractive pixel adjacency matrix,' IEEE Transactions on Information Forensics and Security, 5(2):215-224, Jun. 2010.

R. O. Duda, P. E. Hart, and D. G. Stork, 'Pattern Classification.' Wiley Interscience, 2nd edition, 2000. 737 pgs.

Sheng et al., 'Experiments on Pattern Recognition Using Invariant Fourier-Mellin Descriptors,' Journal of Optical Society of America, vol. 3. No. 6, Jun. 1986, pp. 771-776.

Su et al., 'An Image Watermarking Scheme to Resist Generalized Geometrical Transforms,' Proc. SPIE vol. 4209: Multimedia Systems and Applications III, Nov. 2000, pp. 354-365.

Su et al., 'Synchronized Detection of the Block-based Watermark with Invisible Grid Embedding,' Proc. SPIE vol. 4314: Security and Watermarking of Multimedia Contents III, Jan. 2001, pp. 406-417.

U.S. Appl. No. 15/063,381, filed Oct. 17, Response to Amendment under Rule 312; dated Oct. 10, 2017 Amendment after Notice of Allowance; dated Sep. 27, 2017 Notice of Allowance; dated Mar. 7, 2016, including Aug. 18, 2017 Response to Restriction; dated Aug. 3, 2017 Restriction; dated May 23, 2016 Preliminary Amendment. 35 pgs.

U.S. Appl. No. 15/154,572, filed May 13, 2016. 91 pgs.
U.S. Appl. No. 61/856,476, filed Jul. 19, 2013. 20 pgs.
U.S. Appl. No. 61/918,214, filed Dec. 19, 2013. 29 pgs.
U.S. Appl. No. 62/063,248, filed Oct. 13, 2014. 23 pgs.
U.S. Appl. No. 62/063,248, filed Oct. 13, 2014. 26 pgs.
U.S. Appl. No. 62/129,655, filed Mar. 6, 2015. 17 pgs.
U.S. Appl. No. 62/322,193, filed Apr. 13, 2016. 73 pgs.

Wang et al. "OR-Benchmark: An Open and Reconfigurable Digital Watermarking Benchmarking Framework", Jun. 2015, arXiv.org, <https://arxiv.org/abs/1506.00243>, p. 1-15.

* cited by examiner

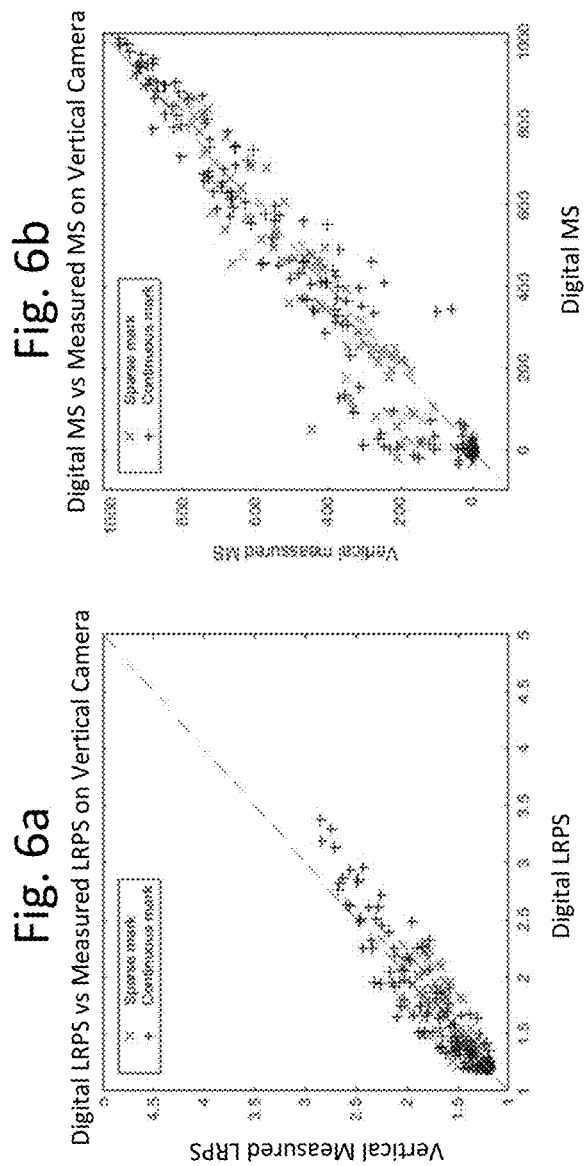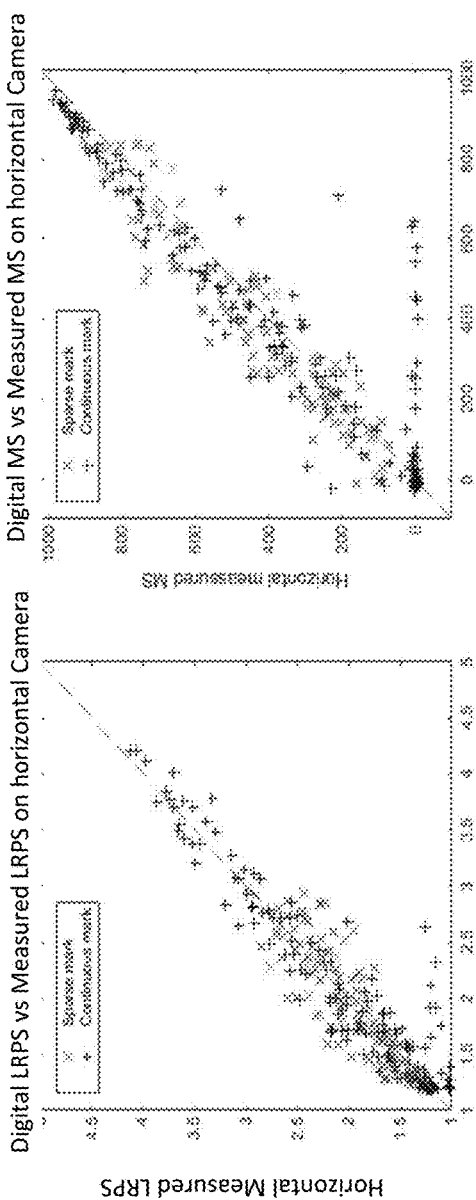

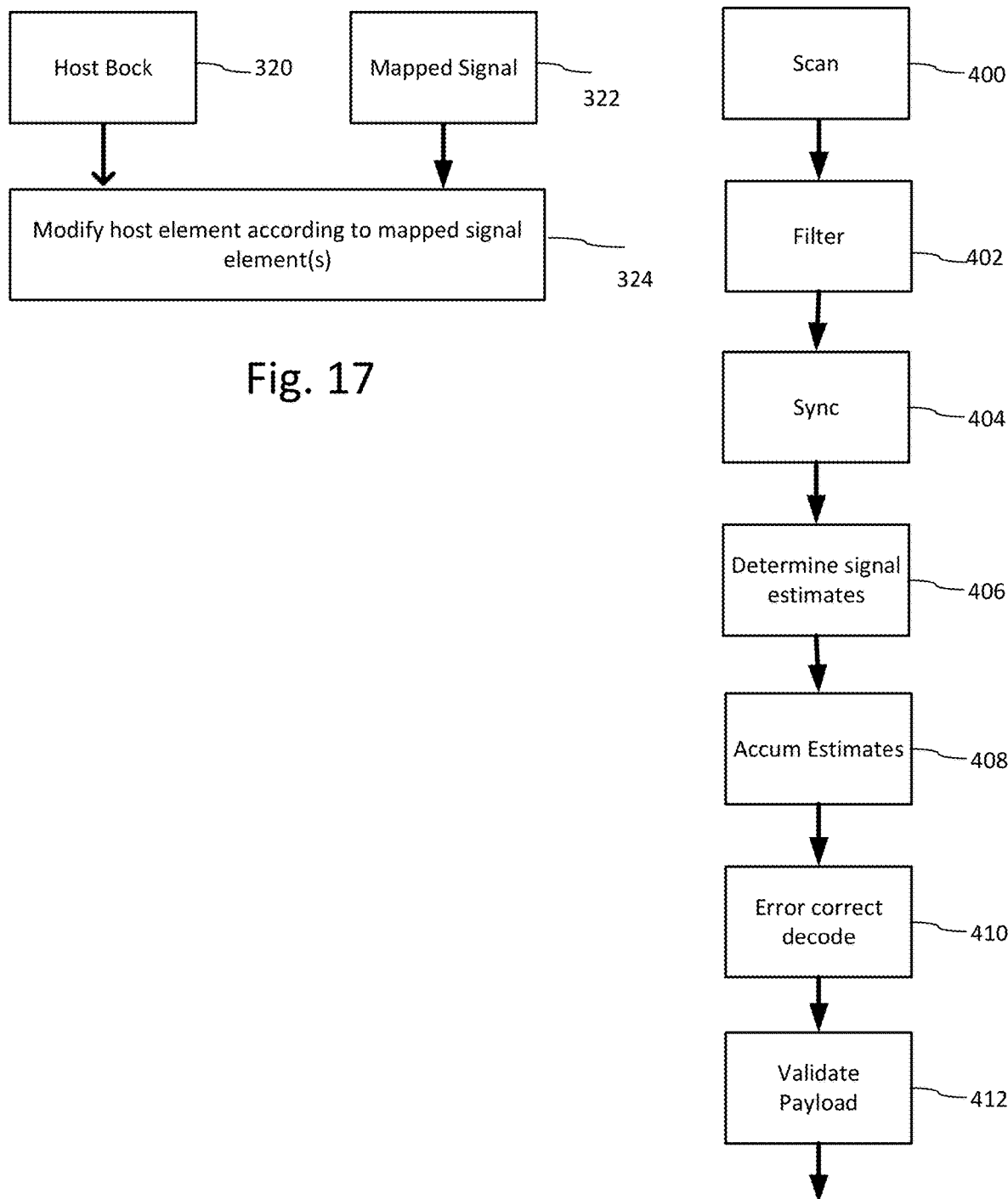

| ES1 | ES1 | ES1 | ES1 | ES1 |
|---|---|---|---|---|
| ES1 | ES1 | 8 | ES1 | ES1 |
| ES1 | ES1 | ES1 | ES1 ⁱ⁴ | ES1 |
| ES1 | ¹⁷ | ES1 | ¹⁹ | ES1 |
| ES1 | ES1 | ES1 | ES1 | ES1 |

FIG. 19C

| ES1 | ES1 | ES1 | ES1 | ES1 |
|---|---|---|---|---|
| ES1 | ES1 | 8 | ES1 | ES1 |
| ES1 | ES1 | ES1 | (ES2) ¹⁴ | ES1 |
| ES1 | ¹⁷ | ES1 | (ES2) ¹⁹ | ES1 |
| ES1 | ES1 | ES1 | ES1 | ES1 |

FIG. 19D

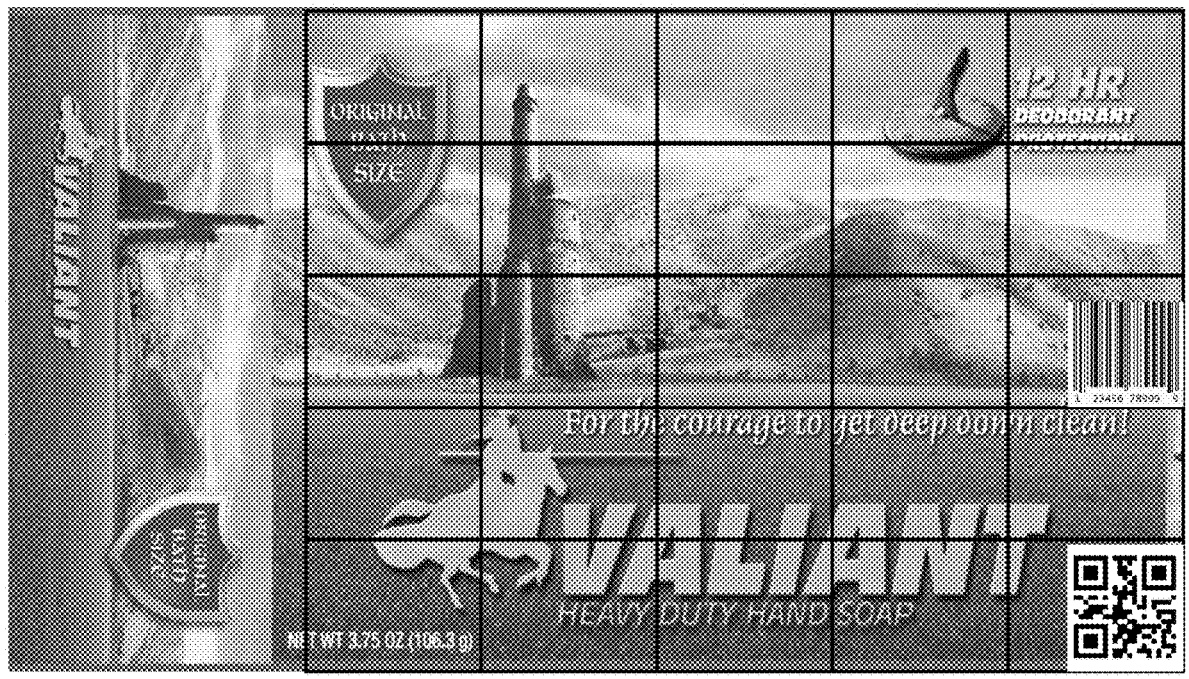
FIG. 20A
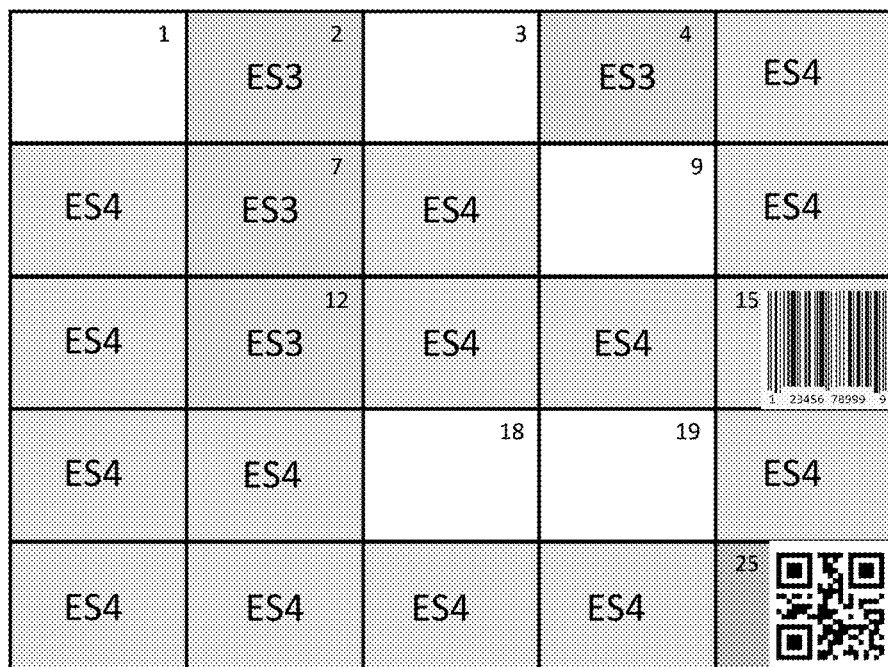
FIG. 20B
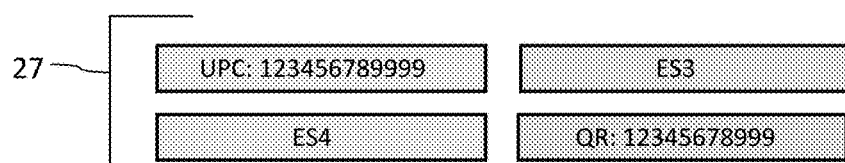

```
import sys

# The timeout interval, or time period within which codes are
# assumed to be scanned from the same physical package. This
# can be in whatever units are appropriate for your system.
# In this demonstration, the frame number is used as the unit
# of time, but a different unit could be used, such as
# milliseconds relative to a timebase. Whatever units are
# chosen, they must be the same units as what is passed in
# current_time when calling the filter.
TIMEOUT_INTERVAL = 5

# This class represents the state and logic of the GTIN filter.
class mmgtin_filter:
    # Initialize the filter.
    def __init__(self):
        # This variable tracks the current state (possible values
        # 0, 1, 2)
        self.state = 0

# This variable tracks the last GTIN received from either
        # DB or 1D decoders
        self.last_gtin = None

# This variable tracks the last GTIN received from the DB
        # decoder
        self.last_digimarc = None

# This variable caches the set of GTINs which are
        # blacklisted from Digimarc reporting
        self.blacklist = set()

# This variable tracks the timeout expiration time
        self.timeout = 0

# This function is called to add a GTIN to the blacklist
    def add_to_blacklist(self, gtin):
        self.blacklist.add(gtin)

# This function is called to determine if a GTIN is on the
    # blacklist.
    def gtin_is_blacklisted(self, gtin):
        return gtin in self.blacklist
```

FIG. 23A

```
# MAIN FILTER ALGORITHM.

# gtin - The GTIN to be filtered.
# is_digimarc - True if the GTIN was a DB, False if it was a 1D
# current_time - The current timestamp. Units don't matter, but
#     must be the same units as TIMEOUT_INTERVAL

# Returns True if the GTIN should be processed as usual, or
# False if the GTIN should be filtered out.
def allow_gtin(self, gtin, is_digimarc, current_time):
    if is_digimarc and self.gtin_is_blacklisted(gtin):
        return False
    if current_time >= self.timeout:
        self.state = 0
        self.last_gtin = None
        self.last_digimarc = None
    self.timeout = current_time + TIMEOUT_INTERVAL if self.state == 0:
        self.last_gtin = gtin
        if is_digimarc:
            self.last_digimarc = gtin
        self.state = 1
        return True if self.state == 1:
        if gtin != self.last_gtin:
            if self.last_digimarc is not None:
                self.add_to_blacklist(self.last_digimarc)
            if is_digimarc:
                self.add_to_blacklist(gtin)
                self.last_digimarc = gtin
            self.state = 2
            return False
        return not is_digimarc if self.state == 2:
        if is_digimarc:
            self.add_to_blacklist(gtin)
        return False
```

FIG. 23B

```
# TEST PROGRAM. Code below this point is not part of the algorithm,
# but can be used to experiment with and test the algorithm.
print 'TIMESTAMP,TYPE,GTIN'
mmg = mmgtin_filter()
inf = open(sys.argv[1], 'r')
inf.readline()
for line in inf.xreadlines():
    fields = line.strip().split(',')
    timestamp = int(fields[0])
    db = fields[1]
    upc = fields[2]
    beep = False
    if db and mmg.allow_gtin(db, True, timestamp):
        print '%d,DB,%s' % (timestamp, db)
        beep = True
    if upc and mmg.allow_gtin(upc, False, timestamp):
        print '%d,UPC,%s' % (timestamp, upc)
        beep = True
    if not beep:
        print '%d,,' % timestamp
```

FIG. 23C

DETECTING CONFLICTS BETWEEN MULTIPLE DIFFERENT ENCODED SIGNALS WITHIN IMAGERY

RELATED APPLICATION DATA

This application is a continuation of Ser. No. 15/704,833, filed Sep. 14, 2017 (now U.S. Pat. No. 10,198,782) which is a non-provisional of application 62/397,743, filed Sep. 21, 2016, and 62/395,282, filed Sep. 15, 2016.

This application is an expansion of U.S. patent application Ser. No. 15/154,572, filed May 13, 2016 (now U.S. Pat. No. 9,690,967), which claims the benefit of U.S. Provisional Patent Application No. 62/248,264, filed Oct. 29, 2015, 62/299,228, filed Feb. 24, 2016, and 62/325,254, filed Apr. 20, 2016. This disclosure is also related to Assignee's U.S. patent application Ser. No. 14/332,739, filed Jul. 16, 2014 (published as US 2015-0030201 A1), which claims priority from 61/918,214, filed Dec. 19, 2013 and 61/856,476, filed Jul. 19, 2013; and Ser. No. 14/881,448, filed Oct. 13, 2015 (published as US 2016-0105585 A1), which claims the benefit of U.S. Provisional Patent Application No. 62/063,248, filed Oct. 13, 2014; and U.S. Provisional Patent Application No. 62/322,193, filed Apr. 13, 2016.

Each of the patent documents mentioned above is hereby incorporated herein by reference in its entirety, including all drawings and any appendices.

TECHNICAL FIELD

This disclosure relates to advanced signal processing technology including steganographic embedding and digital watermarking. This disclosure also provides technology for determining and/or detecting conflicting machine-readable codes within imagery.

BACKGROUND AND SUMMARY

Portions of this disclosure are described in terms of, e.g., encoded signals for digital designs, product packaging (sometimes just referred to herein as "packaging" or "package") and other objects. These encoding techniques can be used, e.g., to alter or transform how color inks are printed on various physical substrates. The alterations or transformations preferably result in a printed design carrying machine readable indicia on a surface of a physical object.

Various forms of signal encoding (or "embedding") include, e.g., "steganographic encoding" and "digital watermarking." Digital watermarking is a process for transforming physical or electronic media to embed a machine-readable code (or "auxiliary data") into the media. In some cases the media is modified such that the embedded code is obscured, yet may be detected through an automated detection process. Digital watermarking is often applied to electronic or physical objects such as printed objects, images, audio signals, and video signals. However, it may also be applied to other types of objects, including, e.g., product packaging, electronics such as circuit boards and CPUs, stickers, logos, product hang tags, line-art, software, multi-dimensional graphics models, and surface textures of such objects.

In this document we use the terms "digital watermark" and "watermark" (and various forms thereof) interchangeably. Unless otherwise stated, such watermarks are typically steganographic. That is, they escape notice when printed on product packaging and viewed by an untrained observer who is not previously alerted to their existence, under typical viewing conditions (e.g., a viewing distance of 20 inches, with 75-100 foot-candles of illumination).

Auxiliary data embedding systems typically include two components: an encoder (or embedder) that embeds the auxiliary signal in a host image or object, and a decoder (or detector) that detects and reads the embedded auxiliary signal from the host image or object. The encoder may embed the auxiliary signal by altering or transforming a host image or object to carry the auxiliary data. The detection component analyzes a suspect image, object or signal to detect whether an auxiliary signal is present, and if so, extracts or reads information carried in it.

Several particular digital watermarking and auxiliary data embedding techniques have been developed. The reader is presumed to be familiar with the literature in this field. Particular techniques for embedding and detecting imperceptible digital watermarks are detailed in the assignee's patent documents including US Published Patent Application No. 20150156369; U.S. patent application Ser. No. 14/725,399, filed May 29, 2015, Ser. No. 14/724,729, filed May 28, 2015 (published as US 2016-0217547 A1), and Ser. No. 14/842,575, filed Sep. 1, 2015; International Application No. PCT/US2015/44904, filed Aug. 12, 2015 (published as WO 2016025631 A1) and U.S. Pat. Nos. 7,054,461, 7,286,685, and 9,129,277. Related technology is detailed in Assignee's U.S. patent application Ser. No. 15/073,483, filed Mar. 17, 2016. Each of the patent documents mentioned in this paragraph is hereby incorporated herein by reference in its entirety, including all drawings and any appendices.

One aspect of the technology concerns an image processing method for quality assurance checking of packaging that has been printed with artwork including a first steganographic digital watermark, to confirm that it doesn't inadvertently include a second steganographic digital watermark. Such a method can provide a first frame of data, based on imagery depicting the printed package captured by a camera system, to a steganographic digital watermark decoder. First output data is received in response, including first decoded payload data. A new digital watermark pattern that encodes this first payload data is generated. A counterpart of the new pattern is subtracted from the first frame of data, to yield a second frame of data in which a watermark pattern associated with the first payload data has been attenuated. This second frame of data is provided to the steganographic digital watermark decoder, which returns second output data in response. From this second data, it is determined whether the artwork printed on the packaging includes a second steganographic digital watermark, in addition to the first steganographic digital watermark. By such arrangement, presence of a second watermark that might otherwise escape detection due to existence of a first watermark, can be revealed, allowing packaging that is printed with two different digital watermarks to be flagged as faulty.

Another aspect of the technology concerns a method to make it easier to detect mis-marking of items of product packaging with two steganographic digital watermarks, encoding two different GTIN (Global Trade Identifier Number) identifiers. In such method, a watermark pattern including a GTIN identifier as payload data is conventionally generated. However, either randomly, or based on the payload data, an origin location is determined at which the watermark pattern should be embedded in packaging artwork. The watermark pattern is then inserted into the artwork using the determined origin location. By such arrangement, if two watermark patterns, encoding two different GTIN identifiers, are mistakenly inserted into artwork for a single item of product packaging, the origins of the two watermark patterns will likely be spatially offset, thereby facilitating detection of the two watermarks.

In similar fashion, the scale or rotation at which a watermark pattern is inserted into packaging artwork can be made variable across different product packages, so that if two watermarks are included in artwork for a single package (e.g., in different layers of the artwork), the error can more readily be detected.

A further aspect of the technology concerns logically binding-together multiple different layers of artwork for a product package, so that erroneous inclusion of a layer can be detected. In such a method, each of various artwork layers for a package has a different identifier. These identifiers are combined together—possibly with other data—to yield a cross-check value. This cross-check value is included in a payload encoded into a further layer for the artwork (e.g., in a layer that is watermarked to also convey a GTIN identifier for the package). A set of layers being prepared for printing can then be checked to ensure that the correct layers are being used together, by re-computing the cross-check value based on the respective identifiers, and comparing this value against the cross-check value encoded in the watermarked layer.

Yet another aspect of the technology concerns preventing a consumer from being double-charged for a package that includes two watermarked GTINs. In one such embodiment, when a scanner at a retail checkout detects two different watermarked GTIN identifiers within a single frame of captured imagery, both are added to a blacklist of identifiers. This blacklist governs which detected GTIN identifiers are reported to an associated point of sale (POS) terminal (or, more accurately, which are not reported). In some embodiments, the pair of GTIN identifiers are added to the blacklist only if both indicate the same manufacturer.

The foregoing and other features and advantages of the present technology will be more readily apparent from the following detailed description, which proceeds with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 6a-6d are diagrams showing relationships between detected and predicted detectability measures.

FIG. 17 is a diagram illustrating embedding of an auxiliary signal into host image signal.

FIG. 18 is a flow diagram illustrating a method for decoding a payload signal from a host image signal.

FIG. 19C represents the corresponding blocked area from FIG. 19B, including decoded signals per sub-area.

FIG. 19D represents another instance of the corresponding blocked area from FIG. 19B, including decoded signals per sub-area.

FIG. 20A shows an image including an area for analysis.

FIG. 20B represents the corresponding area from FIG. 20A, including various different decoded signals in some of the sub-areas.

FIGS. 23A-C detail Python code employed in an exemplary embodiment of the technology.

DETAILED DESCRIPTION

Introduction:

The following detailed description is divided into six general sections. It should be understood from the outset, however, that we expressly contemplate combining subject matter from one such section with one or more of the other sections. Thus, the sections and section headings are provided for the reader's convenience and are not intended to impose restrictions or limitations. The sections include: I. Signal Encoder and Decoder; II. Robustness Masks (maps) and Swipe Metrics; III. Construction of Visual Maps Using Robustness as a Mask; IV. Detecting Multiple Different Codes within Imagery; V. Further Improvements; VI. Operating Environment; and VII. Concluding Remarks. The features reviewed in the above Background and Summary Section are addressed primarily in Section V.

I. Signal Encoder And Decoder

Encoder/Decoder

Figure 14:
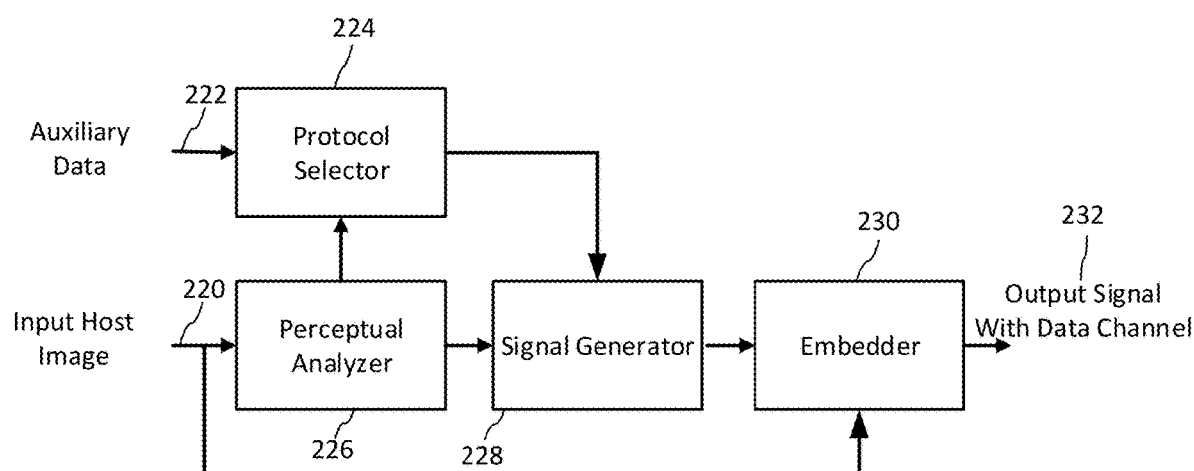
FIG. 14 is a block diagram of a signal encoder for encoding a digital payload signal into an image signal.

FIG. 14 is a block diagram of a signal encoder for encoding a digital payload signal into an image signal. FIG.

15 is a block diagram of a compatible signal decoder for extracting the digital payload signal from an image signal.

While the signal encoder and decoder may be used for communicating a data channel for many applications, one objective for use in physical objects is robust signal communication through images formed on and captured from these objects. Signal encoders and decoders, like those in the Digimarc Barcode Platform from Digimarc Corporation, communicate auxiliary data in a data carrier within image content. Encoding and decoding is applied digitally, yet the signal survives digital to analog transformation and analog to digital transformation. For example, the encoder generates a modulated digital image that is converted to a rendered form, such as a printed image. The modulated digital image includes the encoded signal prior to rendering. Prior to decoding, a receiving device has or communicates with an imager to capture the modulated signal, convert it to an electric signal, which is digitized and then processed by the FIG. 15 signal decoder.

Inputs to the signal encoder include a host image 220 and auxiliary data payload 222. The objectives of the encoder include encoding a robust signal with desired payload capacity per unit of host signal (e.g., a unit may include the spatial area of a two-dimensional tile within the host signal), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., our patent application Ser. No. 14/725,399, filed May 29, 2015, and Ser. No. 15/072,884, filed Mar. 17, 2016, incorporated herein by reference in their entireties.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and/or synchronization method and signals.

The protocol defines the manner in which the signal is structured and encoded for robustness, perceptual quality and/or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 256 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (published as US 2015-0156369 A1), Ser. No. 14/588,636 (published as US 2015-0187039 A1) and Ser. No. 13/975,919, Patent Application Publication No. US 2010-0150434 A1, and U.S. Pat. No. 7,352,878, which are hereby incorporated by reference in their entirety.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and/or available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator 228 produces a data signal with data elements that are mapped to embedding locations in an image tile. These data elements are modulated onto the host image at the embedding locations. A tile may include a pattern of embedding locations. The tile derives its name from the way in which it is repeated in contiguous blocks of a host signal, but it need not be arranged this way. In image-based encoders, we may use tiles in the form of a two dimensional array (e.g., 128×128, 256×256, 512×512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. patent application Ser. No. 13/975,919; and see also, U.S. patent application Ser. No. 14/588,636, filed Jan. 2, 2015 (published as US 2015-0187039 A1), filed Jan. 2, 2015, and Ser. No. 15/137, 401, filed Apr. 25, 2016, each of which is hereby incorporated by reference in its entirety.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. patent application Ser. No. 14/616,686 (published as US 2015-0156369 A1), Ser. No. 14/588,636 (published as US 2015-0187039 A1) and Ser. No. 13/975,919, Patent Application Publication No. US 2010-0150434 A1, and U.S. Pat. No. 7,352,878, already incorporated herein.

The Embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., our patent application Ser. No. 14/616,686 (published as US 2015-0156369 A1), Ser. No. 14/588,636 (published as US 2015-0187039 A1) and Ser. No. 13/975,919 for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference, and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the Embedder signal typically incurs various forms of distortion through its distribution or use. For printed objects, this distortion includes rendering an image with the encoded signal in the printing process, and subsequent scanning back to a digital image via a camera or like image sensor.

Figure 15:
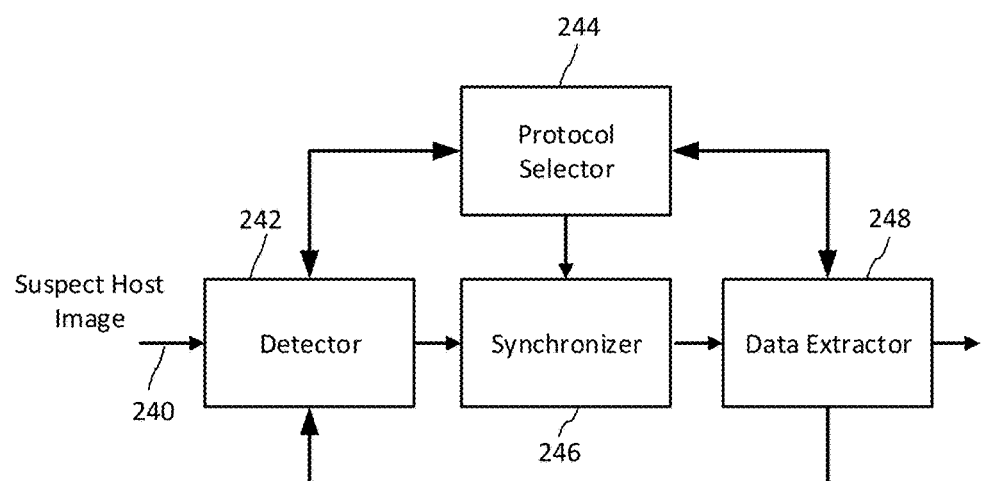
FIG. 15 is a block diagram of a compatible signal decoder for extracting the digital payload signal from an image signal.

Turning to FIG. 15, the signal decoder receives an encoded host signal 240 and operates on it with one or more processing stages to detect a data signal, synchronize it, and extract data.

The decoder may be paired with an input device in which a sensor captures an analog form of the signal and an analog to digital converter converts it to a digital form for digital signal processing. Though aspects of the decoder may be implemented as analog components, e.g., such as preprocessing filters that typically seek to isolate or amplify the data channel relative to noise, much of the decoder is implemented as digital signal processing modules that implement the signal processing operations within a scanner. As detailed below, these modules can be implemented as software instructions executed within an image scanner or camera, an FPGA, or ASIC, etc.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 16:
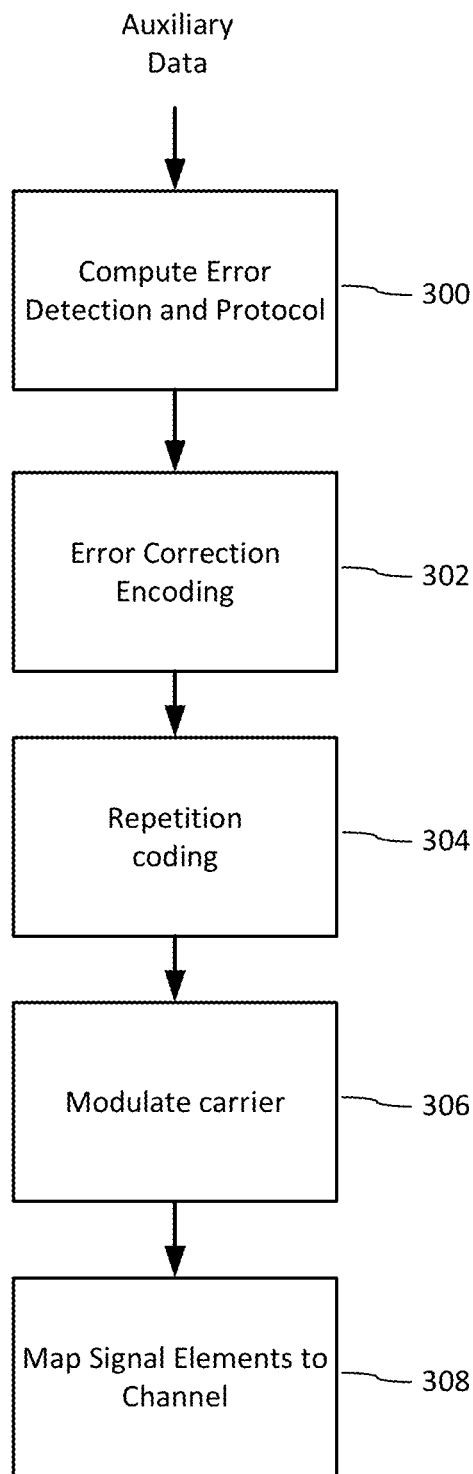
FIG. 16 is a flow diagram illustrating operations of a signal generator.

FIG. 16 is a flow diagram illustrating operations of a signal generator. The diagram depicts processing modules that transform the input auxiliary data into a digital payload data signal structure. The input auxiliary data may include, e.g., a Global Trade Item Number (GTIN) developed by GS1. For example, the GTIN may be structured in the GTIN-12 format for UPC codes. Of course, the input auxiliary data may represent other plural bit codes as well.

For a given protocol, each block provides one or more processing stage options selected according to the protocol. In processing module 300, the auxiliary data payload is processed to compute error detection bits, e.g., such as a Cyclic Redundancy Check (CRC), Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (1/3 rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder extracts estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our U.S. Pat. Nos. 6,614,914, and 5,862,260, which are hereby incorporated herein by reference in their entireties.

In particular, one example of an explicit synchronization signal is a signal comprised of a set of sine waves, with pseudo-random phase. These sine waves appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference in its entirety.

Our US Patent Application Publication No. US 2012-0078989 A1, which is hereby incorporated by reference in its entirety, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. patent application Ser. No. 14/724,729 (published as US 2016-0217547 A1), which are hereby incorporated by reference in their entireties.

Signal Embedding in Host

FIG. 17 is a diagram illustrating embedding of an auxiliary signal into host signal, according to an illustrative method. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added, or added separately with separate mask coefficients to control the signal amplitude independently.

Applying the method of FIG. 16, the product or label identifier (e.g., in GTIN format) and additional flag or flags used by control logic are formatted into a binary sequence, which is encoded and mapped to the embedding locations of a tile. For sake of illustration, we describe an implementation of a tile having 256 by 256 embedding locations, where the embedding locations correspond to spatial domain embedding locations within an image. In particular, the spatial locations correspond to pixel samples at a configurable spatial resolution, such as 100 DPI or 300 DPI. In this example, we will explain the case where the spatial resolution of the embedded signal is 300 DPI, for an embodiment where the resulting image with encoded data is printed on a package or label material, such as a paper, plastic or like substrate. The payload is repeated in contiguous tiles, each comprised of 256 by 256 of embedding locations. With these embedding parameters, an instance of the payload is encoded in each tile, occupying a block of host image of about 1.28 by 1.28 inches. These parameters are selected to provide a printed version of the image on paper or other substrate. At this size, the tile can be redundantly encoded in several contiguous tiles, providing added robustness. An alternative to achieving desired payload capacity is to encode a portion of the payload in smaller tiles, e.g., 128 by 128, and use a protocol indicator to specify the portion of the payload conveyed in each 128 by 128 tile. Erasure codes may be used to convey different payload components per tile and then assemble the components in the decoder, as discussed in U.S. Pat. No. 9,311,640, which is hereby incorporated herein by reference in its entirety.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in U.S. patent application Ser. No. 14/724,729 (published as US 2016-0217547 A1). In the latter, the tile size may be increased to accommodate the differential encoding of each encoded bit in a pattern of differential encoded bit cells, where the bit cells corresponding to embedding locations at a target resolution (e.g., 300 DPI).

Our U.S. patent application Ser. Nos. 14/725,399 and 15/072,884 describe methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publication No. US 2010-0150434 A1 and U.S. patent application Ser. No. 14/725,399, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits. These bits are modulated onto a pseudo-random carrier to produce watermark signal elements (block 306 of FIG. 16), which in turn, are assigned to the pseudorandom embedding locations within the sub-blocks (block 308 of FIG. 16). An embedder module modulates this signal onto a host signal by increasing or decreasing host signal values at these locations for each error correction coded bit according to the values of the corresponding elements of the modulated carrier signal for that bit.

FIG. 18 is a flow diagram illustrating an illustrative method for decoding a payload signal from a host image signal. Implementations of a watermark decoder and watermark processors available from Digimarc Corporation include:

Digimarc Mobile Software Development Kit; and
Digimarc Embedded Systems SDK.

The Embedded Systems SDK is the one typically integrated into scanner hardware.

Corresponding encoder embodiments available from Digimarc Corporation include:

Digimarc Barcode SDK
Digimarc Barcode Plugin

Returning to FIG. 18, the frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see co-pending U.S. application Ser. No. 14/332,739 (published as US 2015-0030201 A1) and Ser. No. 15/176,498, filed Jun. 8, 2016, which are both hereby incorporated by reference in their entireties.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268, which is hereby incorporated herein by reference in its entirety, for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in our Patent Application Publication No. US 2013-0329006 A1, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., the LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, and 9,182,778, which are hereby incorporated by reference in their entireties.

For more on filters, also see U.S. Pat. No. 7,076,082, which is hereby incorporated by reference in its entirety. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, a synchronization process (404) is executed on a filtered block to recover the rotation, spatial scale, and translation of the encoded signal tiles. This process may employ a log polar method as detailed in U.S. Pat. No. 6,614,914 or least squares approach of U.S. Pat. No. 9,182,778, to recover rotation and scale of a synchronization signal comprised of peaks in the Fourier domain. To recover translation, the phase correlation method of U.S. Pat. No. 6,614,914 is used, or phase estimation and phase deviation methods of U.S. Pat. No. 9,182,778 are used.

Alternative methods perform synchronization on an implicit synchronization signal, e.g., as detailed in Ser. No. 14/724,729 (published as US 2016-0217547 A1). Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct-axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR'd with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

II. Robustness Masks (Maps) And Swipe Metrics

One problem with digital watermarking product packages and other physical objects is obtaining visibility that is subjectively pleasing to a graphic designer and others. For example, a graphic designer may be hesitant to introduce too much "noise" into a product's design. The term "noise" refers to visible artifacts in a spatial domain that may be created when the design is transformed to carry an encoded signal, e.g., steganographic encoding or digital watermarking. These artifacts may sometimes have a noise-like, grainy or other visible appearance. As a result, the designer may crank down digital watermark signal strength (or "gain") or remove the watermarking from some design areas altogether. This may result in a loss of signal robustness, e.g., embedded watermarks carried in the product package may not be detectable in some or all areas of the package surface. We refer to such a package as a low-gain design. (A low-gain design may include areas without watermarking, areas with low-signal gain, perhaps along with some design areas that are robustly embedded.)

Now imagine such a low-gain design in a retail checkout scenario. For example, please see assignee's U.S. Pat. No. 9,224,184, which is hereby incorporated herein by reference in its entirety. In this setting, packages move along at retail checkout, e.g., on a conveyor or with employee-assist. A watermark detector analyzing image data representing a low-gain design may not be able to detect watermarks from the image data. A non-detect may result in a slowed checkout process, requiring human intervention or other process to enter the product's ID code.

Low-gain designs need to be discovered prior to press runs. For example, tens of thousands of packages can be printed (e.g., on offset or digital printing presses) before it's realized that a watermarked package design is a low-gain type. At the printing press stage, it is often too late to "stop the presses" to create new printing plates and roll out a new design, one having a higher encoded signal strength.

Aspects of this disclosure address this problem by predicting embedding strength and/or detectability across a printed product package from the digital design itself. If the predicted strength falls short of a predetermined threshold or other metric the digital design can be re-embedded, flagged for inspection and/or redesigned, etc. A mapping (e.g., a heat map or robustness map representing encoded signal detectability) may be generated to visually indicate predicted watermark readability across the image surface. Moreover, strength across a package's scanning length or swipe path (e.g., horizontal and/or vertical swipe paths) can be quantified and adjusted, if needed.

As discussed above an encoded signal, e.g., digital watermarking, may include multiple components. For example, digital watermarking may include a synchronization component (e.g., a reference pattern) and a message (or payload) component. These components may be combined in some domain (e.g., transform domain) to form a watermark signal. In some cases the synchronization component is introduced into a host signal (e.g., an image or audio signal) prior to introduction of the message component.

The synchronization component can be utilized during signal detection. An embedded host signal undergoes various transformations, such as conversion to and from an analog domain (e.g., offset or digital printing and then image capture of the printed design). Using parameters from a watermark embedder (e.g., the reference pattern), a watermark detector may perform a series of correlations or other operations on captured imagery to detect the presence of a digital watermark. If it finds a watermark, it may determine its orientation within the host signal.

Using the orientation, if necessary, the watermark detector may extract or decode the message. Some implementations do not perform correlation, but instead, use some other detection process or proceed directly to extract the watermark signal.

Watermark detectors can be designed in many ways. One design utilizes stages, where a synchronization component is evaluated in a first stage and if it meets certain thresholds (e.g., based on correlation with a reference pattern) it passes onto a second stage. The message component can be evaluated and read in the second stage. Of course, additional stages can be added, e.g., pre-filtering stages and various strength check stages.

There are many types of synchronization components that may be used with the present technology.

For example, a synchronization signal may be comprised of elements that form a circle in a particular domain, such as the spatial image domain, the spatial frequency domain, or some other transform domain. Assignee's U.S. Pat. No. 7,986,807, which is hereby incorporated herein by reference in its entirety, considers a case, e.g., where the elements are impulse or delta functions in the Fourier magnitude domain. The reference signal comprises impulse functions located at points on a circle centered at the origin of the Fourier transform magnitude. These create or correspond to frequency peaks. The points are randomly scattered along the circle, while preserving conjugate symmetry of the Fourier transform. The magnitudes of the points are determined by visibility and detection considerations. To obscure these points in the spatial domain and facilitate detection, they have known pseudorandom phase with respect to each other. The pseudorandom phase is designed to minimize visibility in the spatial domain. In this circle reference pattern example, the definition of the reference pattern only specifies that the points should lie on a circle in the Fourier magnitude domain. The choice of the radius of the circle and the distribution of the points along the circle can be application specific. For example, in applications dealing with high resolution images, the radius can be chosen to be large such that points are in higher frequencies and visibility in the spatial domain is low. For a typical application, the radius could be in the mid-frequency range to achieve a balance between visibility requirements and signal-to-noise ratio considerations.

Figure 10:
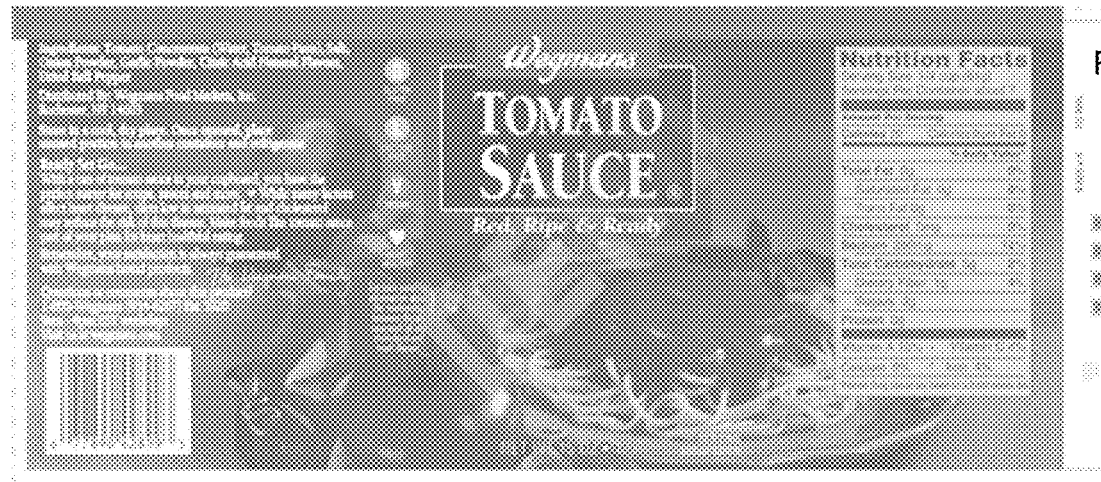
FIG. 10 is a greyscale version of the watermark image (FIG. 9A) with 50% opacity overlaid onto a white background.
Figure 11:
FIG. 11 is the FIG. 9A watermarked image masked using the robustness map in FIG. 9B.

Another example is found in Assignee's U.S. Pat. No. 6,614,914, which is hereby incorporated herein by reference in its entirety. There, a synchronization component (or "orientation pattern") can be comprised of a pattern of quad symmetric impulse functions in the spatial frequency domain. These create or correspond to frequency peaks. In the spatial domain, these impulse functions may look like cosine waves. An example of an orientation pattern is depicted in FIGS. 10 and 11 of the '914 patent.

Another type of synchronization component may include a so-called Frequency Shift Keying (FSK) signal. For example, in Assignee's U.S. Pat. No. 6,625,297, which is hereby incorporated herein by reference in its entirety, a watermarking method converts a watermark message component into a self-orienting watermark signal and embeds the watermark signal in a host signal (e.g., imagery, including still images and video). The spectral properties of the FSK watermark signal facilitate its detection, even in applications where the watermarked signal is corrupted. In particular, a watermark message (perhaps including CRC bits) can be error corrected, and then spread spectrum modulated (e.g., spreading the raw bits into a number of chips) over a pseudorandom carrier signal by, e.g., taking the XOR of the bit value with each value in the pseudorandom carrier. Next, an FSK modulator may convert the spread spectrum signal into an FSK signal. For example, the FSK modulator may use 2-FSK with continuous phase: a first frequency represents a zero; and a second frequency represents a one. The FSK modulated signal is can be applied to rows and columns of a host image. Each binary value in the input signal corresponds to a contiguous string of at least two samples in a row or column of the host image. Each of the two frequencies, therefore, is at most half the sampling rate of the image. For example, the higher frequency may be set at half the sampling rate, and the lower frequency may be half the higher frequency.

When FSK signaling is applied to the rows and columns, the FFT magnitude of pure cosine waves at the signaling frequencies produces grid points or peaks along the vertical and horizontal axes in a two-dimensional frequency spectrum. If different signaling frequencies are used for the rows and columns, these grid points will fall at different distances from the origin. These grid points, therefore, may form a detection pattern that helps identify the rotation angle of the watermark in a suspect signal. Also, if an image has been rotated or scaled, the FFT of this image will have a different frequency spectrum than the original image.

For detection, a watermark detector transforms the host imagery to another domain (e.g., a spatial frequency domain), and then performs a series of correlation or other detection operations. The correlation operations match the reference pattern with the target image data to detect the presence of the watermark and its orientation parameters.

Yet another synchronization component is described in assignee's U.S. Pat. No. 7,046,819, which is hereby incorporated by reference in its entirety. There, a reference signal with coefficients of a desired magnitude is provided in an encoded domain. These coefficients initially have zero phase. The reference signal is transformed from the encoded domain to the first transform domain to recreate the magnitudes in the first transform domain. Selected coefficients may act as carriers of a multi-bit message. For example, if an element in the multi-bit message (or an encoded, spread version of such) is a binary 1, a watermark embedder creates a peak at the corresponding coefficient location in the encoded domain. Otherwise, the embedder makes no peak at the corresponding coefficient location. Some of the coefficients may always be set to a binary 1 to assist in detecting the reference signal. Next, the embedder may assign a pseudorandom phase to the magnitudes of the coefficients of the reference signal in the first transform domain. The phase of each coefficient can be generated by using a key number as a seed to a pseudorandom number generator, which in turn produces a phase value. Alternatively, the pseudorandom phase values may be computed by modulating a PN sequence with an N-bit binary message. With the magnitude and phase of the reference signal defined in the first transform domain, the embedder may transform the reference signal from the first domain to the perceptual domain, which for images, is the spatial domain. Finally, the embedder transforms the host image according to the reference signal.

A correlation based technique can be used to help locate and decode the watermark signal.

To evaluate watermark characteristics in a digital design and use such to predict detectability on a corresponding printed object, we generate detectability measures that correspond in various ways to the embedded watermark signal (e.g., the synchronization component and/or the message component). The premise is that if we can estimate the detectability measures in a digital design, then we can estimate the chance of a successful read when that digital design is printed, e.g., on a product package, scanned (e.g., image capture of the printed product package) and decoded.

Some of our detectability measures are described and applied below.

Figures 1A, 1B:
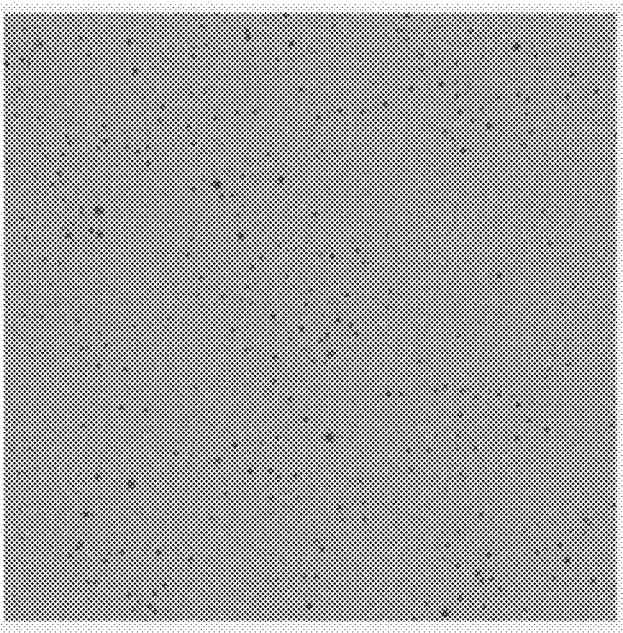
FIGS. 1a and 1b illustrate example watermarked digital images, which are part of a test set.

For this analysis we used 300 digital test images each including a 2 by 2 inch patch. The image size and sample size of these images are not critical, but are useful to help illustrate aspects of this disclosure. Two examples of test image patches are shown in FIG. 1a and FIG. 1b.

Each of the digital test images is embedded with digital watermarking including a reference pattern and a message. Some of the images include so-called "sparse" digital watermarking, e.g., as described in assignee's U.S. patent application Ser. Nos. 14/725,399 and 15/072,884, both previously incorporated by reference. Some images include digital watermarking as generally discussed, e.g., in assignee's US Published Patent Application No. US 2015-0156369 A1, which is hereby incorporated herein by reference in its entirety.

These embedded, test images are then printed, e.g., using an Epson 4900 printer with a GRACoL profile and semi-matte paper. An image capture device, e.g., the Datalogic 9800i (including a horizontal and vertical camera) with a video feed enabled was used to capture 100 digital images of each printed test image for each camera (so a total of 200 digital images or "scans" were captured for each test image). The printed images were each positioned in a way that allows maximum detection for the given camera. Additionally, each printed image was placed on a plate (again, in the most readable position on the scanner) and automatically swiped 400 times in front of each camera. A robotic arm ("robot") that moves the printed images in front of the cameras was used for this other image capture. All captured, digital images were saved and evaluated as discussed below.

A watermark detector analyzed each digital image captured from the scans. The following detection measures were determined.

Reference Pattern Strength (RPS): For each captured digital image we determined its RPS, which, e.g., comprises a sum of bounded frequency domain signal peak strengths. This value can be normalized, e.g., between 0 and 2, for each peak strength. RPS mean from the test images are shown in FIG. 2a, which has a rather large standard deviation.

Linear Reference Pattern Strength (LRPS): Here we determine the average of unbounded peak strengths. For example, we compare each reference pattern peak to its neighbors (e.g., 4, 6 or 8 neighbors). In other words, how does this peak compare to its neighborhood, e.g., in terms of magnitude or other measure. The subject peak value can be divided by the average value of its neighbors. Its measure includes a better behaved standard deviation compared to the RPS, as seen in FIG. 2b.

Phase Deviation Strength (PDS): This measure represents how consistent is the phase of reference pattern peaks are relative to translation. It is, however, very sensitive to how well rotation and scale are estimated, which leads to extremely high standard deviation, as shown in FIG. 2c.

Criterion Strength (CS): Is a combination of Reference Pattern Strength and Phase Deviation. The value of Criterion Strength can be represented as:

Criterion Strength=0.17*RPS−PDS−46.5.

Figure 2E:
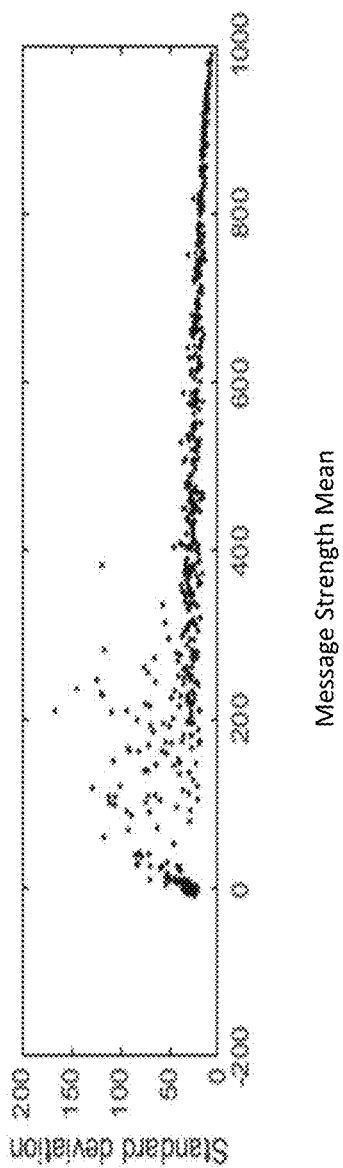
FIGS. 2A-2E are graphs showing standard deviation for various strength measures.
Figure 2A:
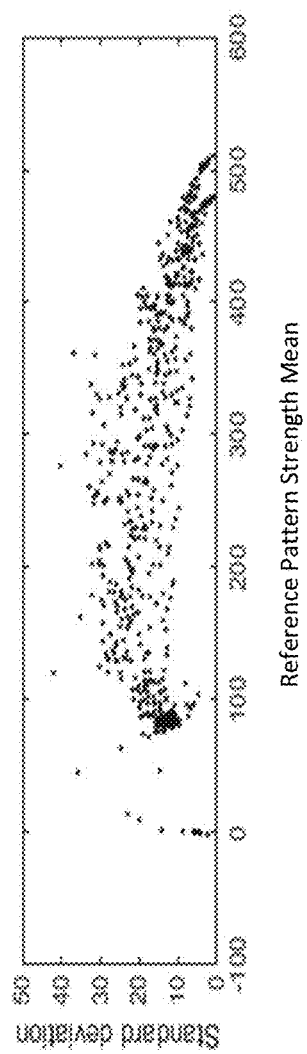
Figure 2B:
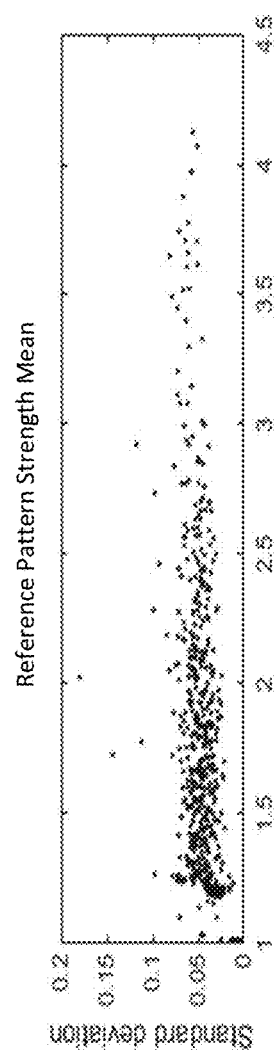
Figure 2C:
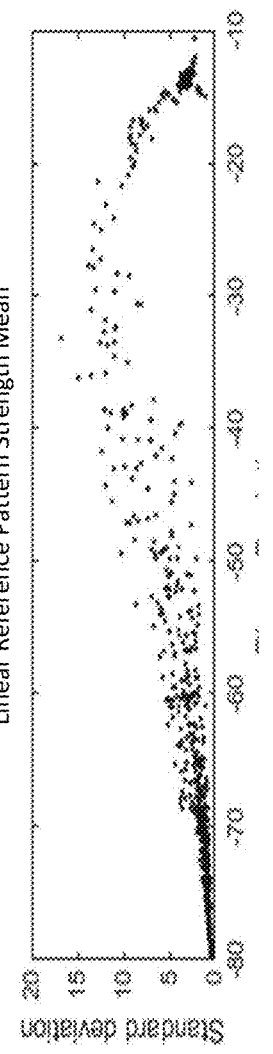
Figure 2D:
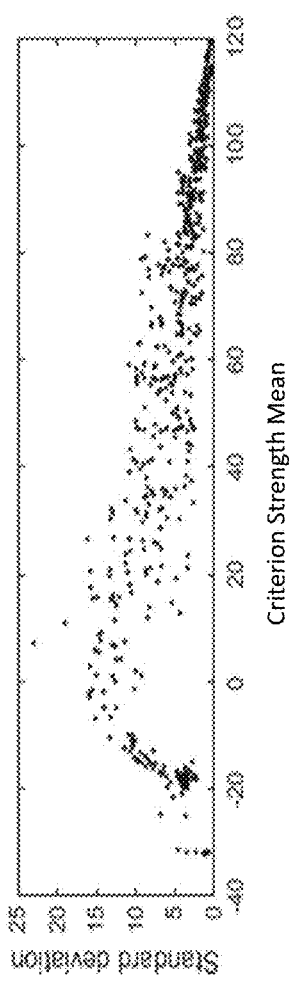

However, since this criterion includes two measures with high variance, as seen in FIG. 2d, it is difficult to estimate the CS.

Message Strength (MS): One example of message "strength" was described in assignee's U.S. Pat. No. 7,286,685, which is hereby incorporated by reference in its entirety. From the '685 patent, one approach for measuring strength of a message signal is as follows: (1.) Use the message payload read from the watermark to re-create the original embedded bit sequence (including redundantly encoded bits from error correction coding) used for the watermark. (2.) Convert the original bit sequence so that a zero is represented by −1 and a one is represented by 1. (3.) Multiply (element-wise) the soft-valued bit sequence used to decode the watermark by the sequence of step 2. (4.) Create one or more measures of watermark strength from the sequence resulting in the previous step. One such measure is the sum of the squares of the values in the sequence. Another measure is the square of the sum of the values in the sequence. Other measurements are possible as well. For example, soft bits associated with high frequency components of the watermark signal may be analyzed to get a strength measure attributed to high frequency components. Such high frequencies are likely to be more sensitive to degradation due to photocopying, digital to analog and analog to digital conversion, scanning and re-printing, etc. (5.) Compare the strength measures to thresholds.

Figure 3:
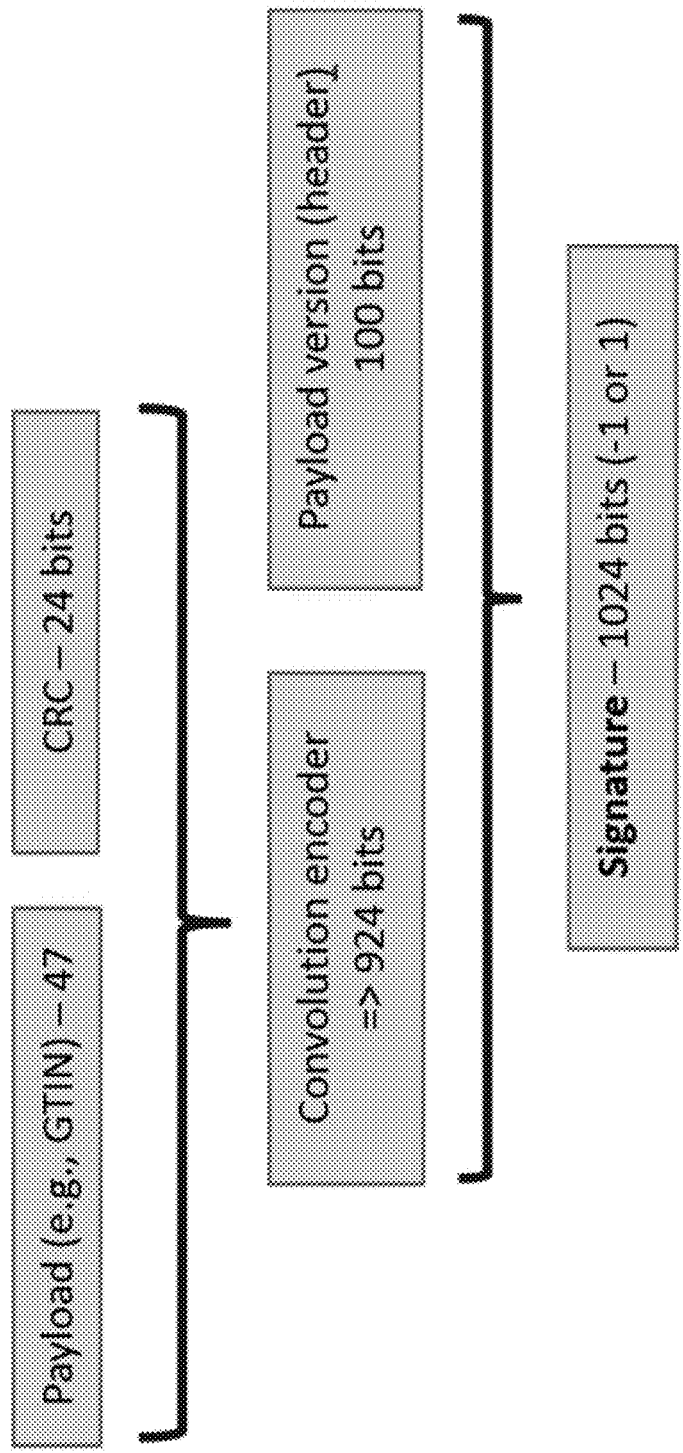
FIG. 3 is a diagram showing construction of a message signature.

Another method, introduced in this patent document, is a correlation metric based on a watermark's message signature. With reference to FIG. 3, a signature is generated based on a payload or message, e.g., carrying a GTIN, UPC, identifier or some other plural-bit message. While there are specific bit numbers illustrated in FIG. 3, the present disclosure is not so limited, as we may include many more or less bits for the various payload components. The payload can be combined with CRC bits, and the combination can be error corrected, e.g., with a convolutional encoder. A payload header can be added to help distinguish the type or format of the watermarking or to indicate a payload version. The resulting bit string can be used as the signature.

Each bit of the signature can be placed redundantly in a digital image. For example, in a tile design, where watermark tiles (e.g., a 128×128 message tile) are tiled across an image or image area, each bit of the signature can be mapped, e.g., 8-16 times, to a pseudo-random location (with pseudo-random sign) to create a message tile.

The signature is unique for each GTIN and the Message Strength (MS) and can be represented as a relationship between the embedded signature and the sign of the decoded signature:

$$MS = \sum_{i=1}^{1024} EmbeddedSignature(i) * \text{sign}(DecodedSignature(i))$$

This measure has relatively small standard deviation, as seen in FIG. 2e.

Additional signal strength metrics are discussed in U.S. Pat. No. 7,054,461, e.g., a so-called Power Ratio and Payload Recovery Assessment. The U.S. Pat. No. 7,054,461 is hereby incorporated herein by reference in its entirety.

The power ratio metric measures, e.g., the degradation of a watermark signal (e.g., a synchronization component) at selected frequencies.

The Payload Recovery Assessment measures watermark strength, including the degree of correlation between a synchronization component and a detected signal, and a measure of symbol errors in raw message estimates. One way to measure the symbol errors is to reconstruct the raw message sequence using the same error correction coding process of the embedder on the valid message extracted from the watermark. This process yields, for example, a string of 1000 binary symbols, which can be compared with the binary symbols estimated at the output of a spread spectrum demodulator. The stronger the agreement between the reconstructed and detected message, the stronger the watermark signal.

Figure 4:
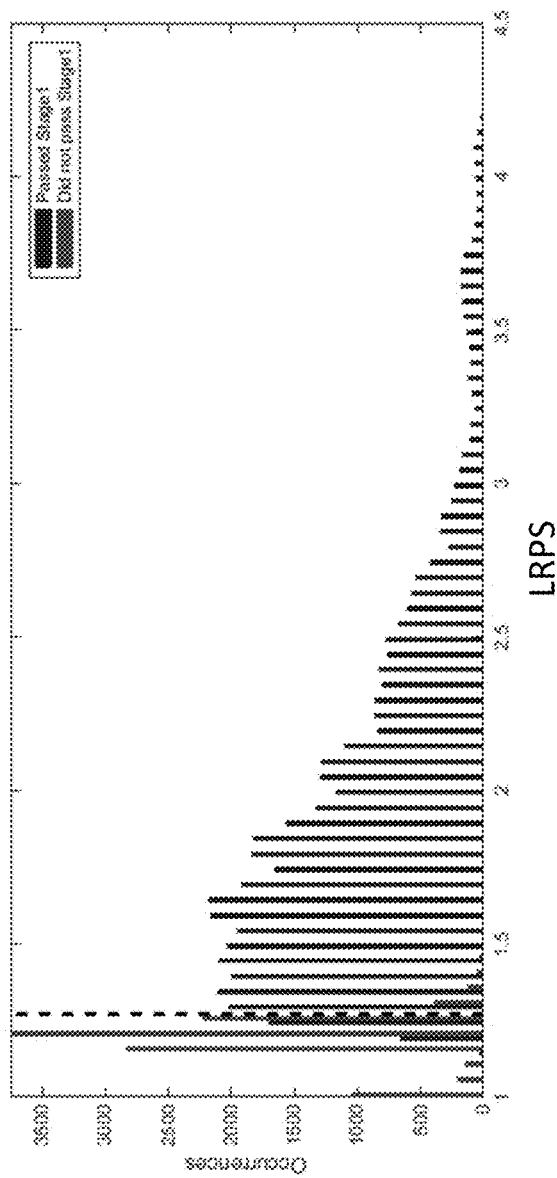
FIG. 4 is a histogram showing a detectability measure (linear reference pattern strength) in terms of detection stage passes.

Thanks to their small variance leading to easier predictability, Linear Reference Pattern Strength (LRPS) and the Message Strength (MS) are selected in a first example as detectability measures. These measures are first correlated with an actual watermark detector behavior. For example, LPRS is correlated with passing stage 1 (or "first stage") of a detection process. Here, as mentioned above, stage 1 includes a synchronization stage, where a reference pattern can be detected or correlated relative to a known reference pattern. FIG. 4 shows a histogram of LRPS values based on whether a watermark tile passed the first stage. The blue lines indicate scanned images having an LRPS that passed the first stage, and the red lines indicate scanned images having an LRPS that did not pass the first stage. A decision can be made to establish a threshold (vertical dashed line) indicating that the first stage threshold is passed if the LRPS is larger than a predetermined LRPS value. While this threshold need not be held completely, however, it greatly simplifies the criteria. For example purposes we set a strength threshold, T, of 1.27, so $T_{LRPS}$=1.27. Of course, the threshold can be moved up, e.g., 1.5 to ensure less false positives, or moved down, e.g., 1.1 if more false positives are acceptable.

Figure 5:
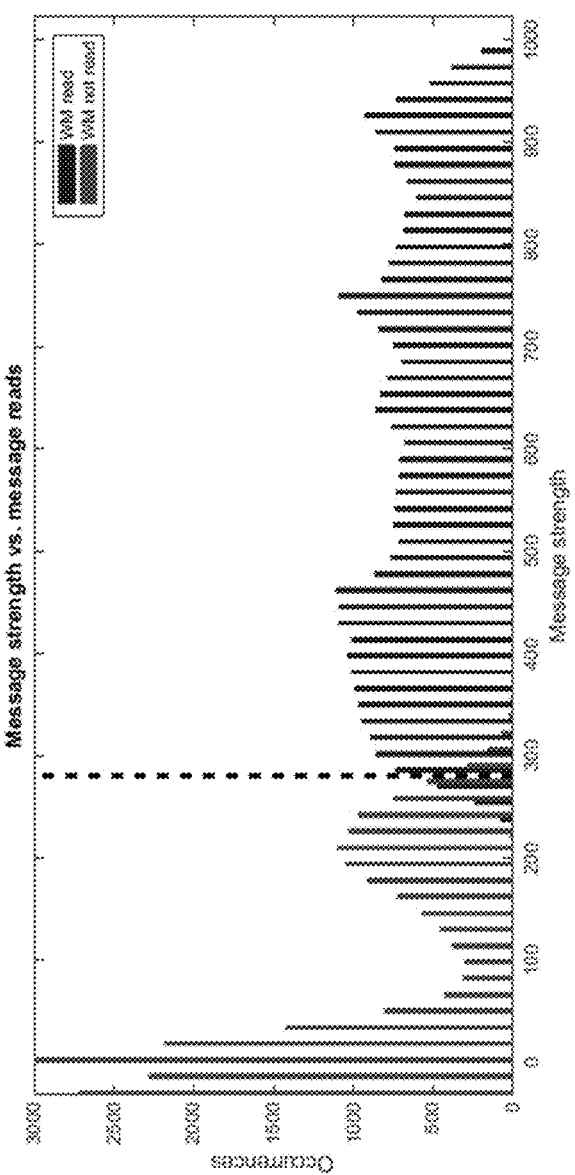
FIG. 5 is a histogram showing a detectability measure (message strength) in terms of successful watermark message reads.

FIG. 5 shows a histogram plot for Message Strength. Again, the blue lines represent those images with a certain Message Strength resulting in successful message reads, and the red lines represent those images with a certain Message Strength resulting in unsuccessful message reads. A strength threshold (vertical dashed line in FIG. 5) can be determined to represent when a watermark message is read. For example purposes we set of strength threshold, T, of 280 so $T_{MS}$=280. This value can change to accommodate more or less false positive tolerance.

Using this criteria for LRPS and MS, we can predict that a digital watermark is likely to be successfully read when:
1. LPRS>$T_{LPRS}$; and
2. MS>$T_{MS}$.

This is all fine and good for data that has been collected in a "design-print-image capture-detect" scenario. But, recall that we are interested in predicting how a digital image, once embedded with digital watermarking and before printing, will be detectable after printing. So how do we apply our above thresholds and detectability measures to a digital image, one that once watermarked will be used to guide printing, e.g., on physical product packaging?

One approach is to transform watermarked digital images so that the transformed, watermarked images correspond to what an image capture device sees, and to what a watermark detector ultimately analyzes when detecting a watermark from captured imagery. In a transformed, watermarked image case, we can extract the LRPS and MS statistics using a watermark detector on the transformed, watermarked digital image. Using these detectability measures and the thresholds discussed earlier, we can predict whether a digital watermark will be read once printed on a physical surface. We affectionately call these types of transformations an "attack," because they degrade the quality of a watermarked digital image.

One improvement is that the whole image pipeline (digital image->watermark embedding->print->color transform (e.g., with a red LED/laser)->image capture->watermark detect) need not be simulated during the attack. Rather, we introduce an attack that would make the LGS and MS statistics generally correspond to the statistics extracted directly from a scanned image.

For example, if we want to estimate robustness using a specific scanner, we can evaluate the attack by comparing the LRPS and MS determined on "attacked" watermarked digital images with the LRPS and MS obtained by printing the images, putting them in front of the scanner and taking image captures from the scanner (e.g., Datalogic's 9800i) for watermark detection.

One example attack for watermarked embedded digital images proceeds as follows. (While this example is geared toward a two-camera system like the Datalogic 9800i, it need not be so.)
  a. Add noise to the original digital artwork. Gaussian noise is one example. For a two camera system, noise standard deviation for the vertical camera is approximately 28, and for horizontal camera is approximately 22.
  b. For the horizontal camera, blur the digital image. This simulates a 30-50 degree pre-distortion and resampling. A 7×7 averaging kernel can be used for the blur.
  c. Down sample the image in a manner similar to watermark detection. For example, if a watermark detector down samples by 3, then the image can be convolved with a 3×3 averaging kernel and subsampling.
  d. For multiple in-plane (yaw) rotations obtain detectability measures.

Our initial watermarked, digital image test set was degraded according to the above attack. Referring to FIGS. 6a-6d, results from the images on the x axis are the measures extracted from "attacked" digital images. On the y axis are the measures extracted from printed/scanned captures of the same (but not attacked) embedded digital. The "x" marks correspond to the so-called "sparse" watermarking mentioned above, and the "+" marks correspond to watermarking introduces through changes in process colors, e.g., as discussed in assignee's US Published Patent Application No. US 2015-0156369 A1. Ideally, we want the values to be correlated, therefore, as close to diagonal as possible. FIGS. 6a and 6b show closely correlated values.

With reference to FIG. 6c and FIG. 6d, examples of wrong fits include the "+" markers on the bottom of the horizontal camera attacks. We found that these data points correspond to very dark images which are unreadable using our test scanner. Thus, the simulated detectability measures are much higher than the captured ones. This is a result of our test scanner, and not of the attack.

Given a digital watermarked image, we can now attack it to obtain estimated LRPS and MS detectability measures. For example, after an attack, a digital watermark detector analyzes the attacked image and determines detection measures, e.g., on a per tile basis, throughout the image. We can simplify a detection prediction by saying that LRPS and MS measure must be larger than some threshold in order to detect. This can be written in probabilistic form as:

$$P(\text{detection}) = P(\text{LRPS} > T_{LRPS}) \cdot P(\text{MS} > T_{MS})$$

For simplification, and letting LRPS=LGS (just a different name) we can assume that the estimation error of LGS and MS follow a normal distribution $\mathcal{N}$ with zero mean and standard deviation measured from the plots above, $\sigma_{LGS}$=0.3, $\sigma_{MS}$=100

Finally, the probability of detection can be written as:

$$P(\overline{LGS}, \overline{MS}) = P(lgs > T_{LGS}; lgs \sim \mathcal{N}(\overline{LGS}, \sigma_{LGS}^2)) \cdot$$
$$P(ms > T_{MS}; ms \sim \mathcal{N}(\overline{MS}, \sigma_{MS}^2))$$
$$= (1 - cdf(1.27; \overline{LGS}, 0.3^2)) \cdot (1 - cdf(280; \overline{MS}, 100^2))$$

With knowledge of the robot arm speed, the test image size and the watermark tile configuration, we can simulate a swipe path moving through the watermark tiles. By doing multiple simulations with different swipe starting locations, we can obtain the average swipe rate. Swipe rate is determined since printed product packages are often "swiped" in front of a camera during retail check out. So the camera (and watermark detector) sees a swath of imagery or a stripe of imagery across a package.

Probability of swipe detection using local read rates $P(\overline{LGS}^{(f,s)}, \overline{MS}^{(f,s)})$ from frame f of swipe s:

$$P(\text{swipe } s) = 1 - \prod_{\text{frames } f \text{ in swipe } s} (1 - P(\overline{LGS}^{(f,s)}, \overline{MS}^{(f,s)}))$$

Final swipe detection rate is computed as an average over all (or a subset of all) simulated swipes s along a path, e.g., horizontal or vertical path or for an entire image.

Figure 7:
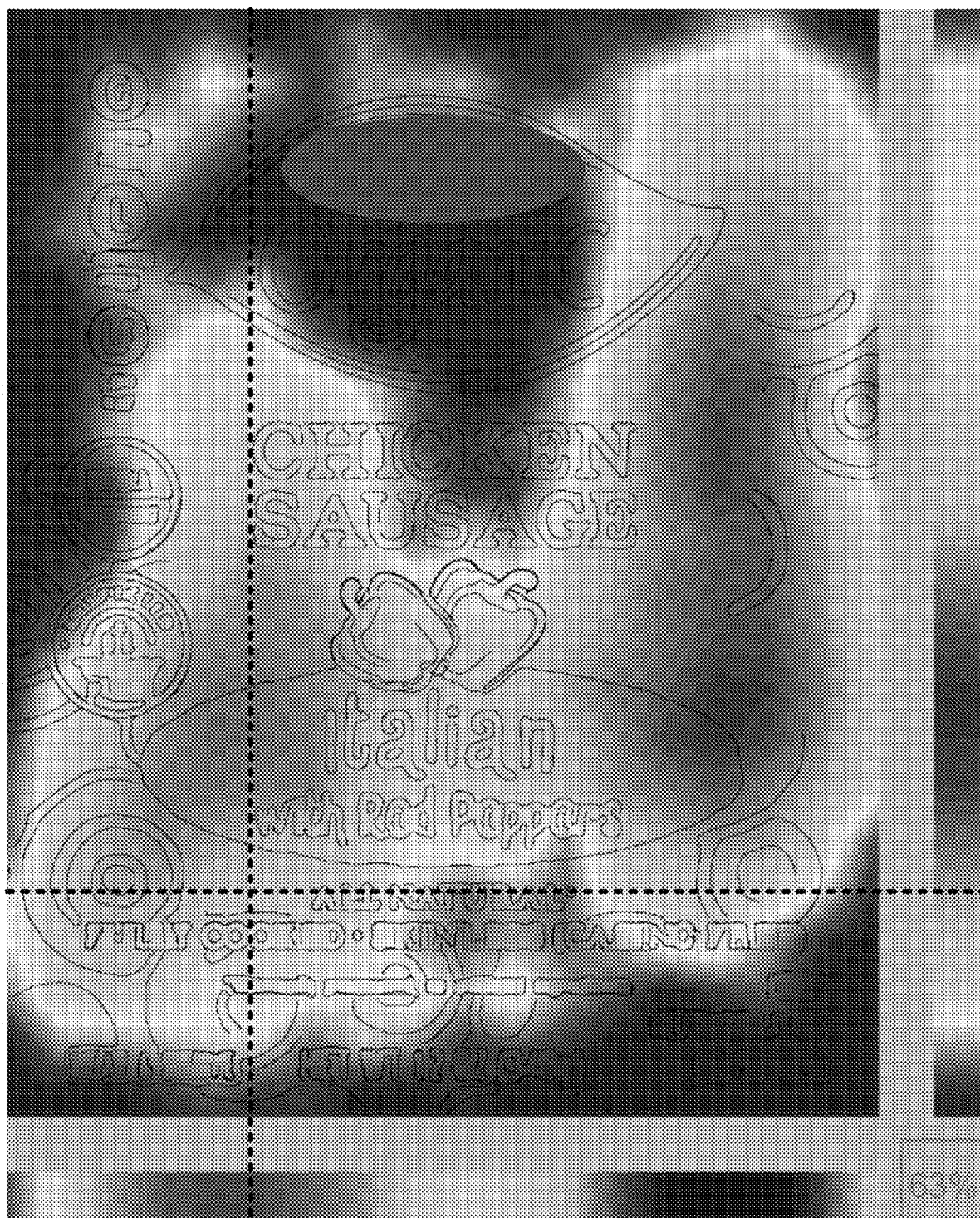
FIG. 7 is a heat map showing predicted watermark detection per area for an embedded digital image.

With reference to FIG. 7, after attack and watermark detection per tile or area, a heat map can be generated showing the overall probability of watermark detection for the image. That is, probabilities can be assigned color values, and the color values are shown in a spatial map form relative to the image. In FIG. 7, red areas are those having a low-gain or low probability of watermark detection once the digital image (watermarked, but without the attack) is printed, scanned and analyzed with a watermark detector. The blue areas are those having a high chance of detection from the printed digital image (watermarked, but without the attack). The scale moves through other colors between red and blue.

FIG. 7 also includes a horizontal and vertical color bar. The vertical bar shows swipe read probability if a swipe path is taken horizontally through the image. For example, at a particular location, the vertical color bar corresponds to a virtual swipe along the horizontal dashed line. (As discussed above, the probability of tiles along the path can be averaged to determine the overall path probability. Alternatively, extreme probabilities can be weighted or discounted depending on tolerances for a particular application.) Here, along the horizontal dashed path, its light blue, indicating a likely read. The horizontal color bar also shows the collective probability for a vertical swipe path (e.g., along the dashed vertical line). An overall score can be determined for the digital image (e.g., "63%" shown in the lower right hand corner of FIG. 7). A threshold can be set, e.g., somewhere between 60-90% (e.g., below 90%, or below 85%, or below 80%, or below 75%, or below 70% or below 65%, etc.) and any image falling below such threshold will be flagged for or automatically re-embedded, e.g., using a stronger embedding strength or different type of encoding protocol.

One or more graphical user interfaces (GUI) may be configured to control display of the heat map on a display screen, e.g., computer monitor, touchscreen display, smartphone display, OLED display, TV screen, projection, etc. The GUIs may be configurable to allow emphasis of embedded areas that have low-gain or high robustness. In other cases, the GUI allows a user to highlight areas for re-embedding, e.g., on a touchscreen display that a user may trace an area for re-embedding. The GUI keeps track of the trace and corresponds such to the digital image, which can be used as a mask for re-embedding digital watermarking.

III. CONSTRUCTION OF VISUAL MAPS USING ROBUSTNESS AS A MASK

A heat map or robustness map (e.g., as shown in FIG. 7) can be used as an image mask to visually evidence digital watermark robustness or detectability throughout an image.

Figure 9A:
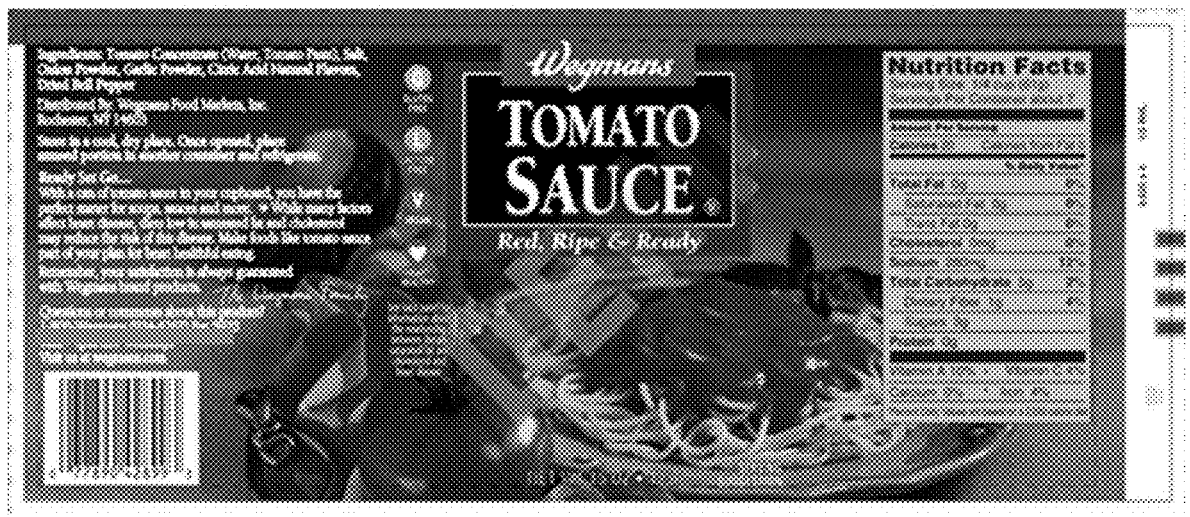
FIG. 9A shows a watermarked image.
Figure 9B:
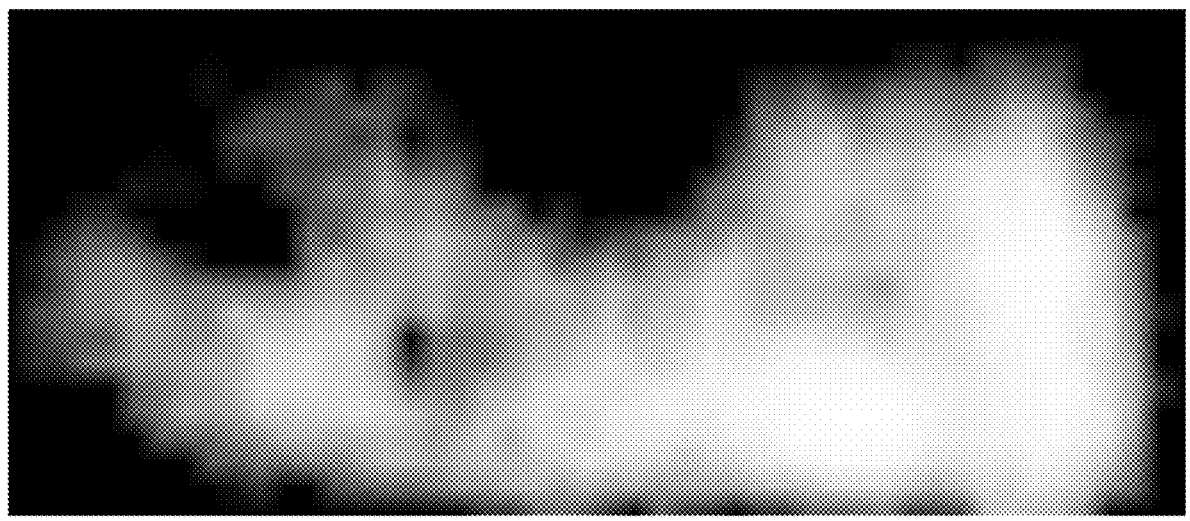
FIG. 9B show a corresponding robustness map of the watermarked image in FIG. 9A.

For example, consider the image shown in FIG. 9A. This particular image represents a product package design, e.g., for delicious Tomato Sauce. The illustrated design includes digital watermarking embedded therein. The watermarked design can be analyzed, e.g., as discussed above in Section II, to determine watermark signal detectability.

A robustness map can be generated corresponding to the detectability results. For example, and with reference to FIG. 9B, a robustness map can be generated to show areas having relatively stronger detectability. In this case (unlike FIG. 7), the white areas show those areas having sufficient detectability, e.g., based on a threshold or relative to other image areas having lower detectability (e.g., shown in black color in FIG. 9B). In particular, the white areas may indicate a high probability of the digital watermarking being read by a red LED Point of Sale scanner, whereas dark areas may indicate low probability of the watermark being read by the red LED scanner. Assignee's U.S. patent application Ser. No. 14/616,686, filed Feb. 7, 2015 (published as US 2015-0156369 A1), which is incorporated herein by reference, discusses various spectral characteristics of typical red LED scanners.

One illustrative process operates on a watermarked image (e.g., FIG. 9A) and its corresponding robustness map (e.g., 9B). The following steps can be performed in image editing and design suites, e.g., Adobe's Photoshop or Illustrator, etc. Of course, these steps can be automated with software code, scripts, functions, circuitry and/or modules.

Figure 12:
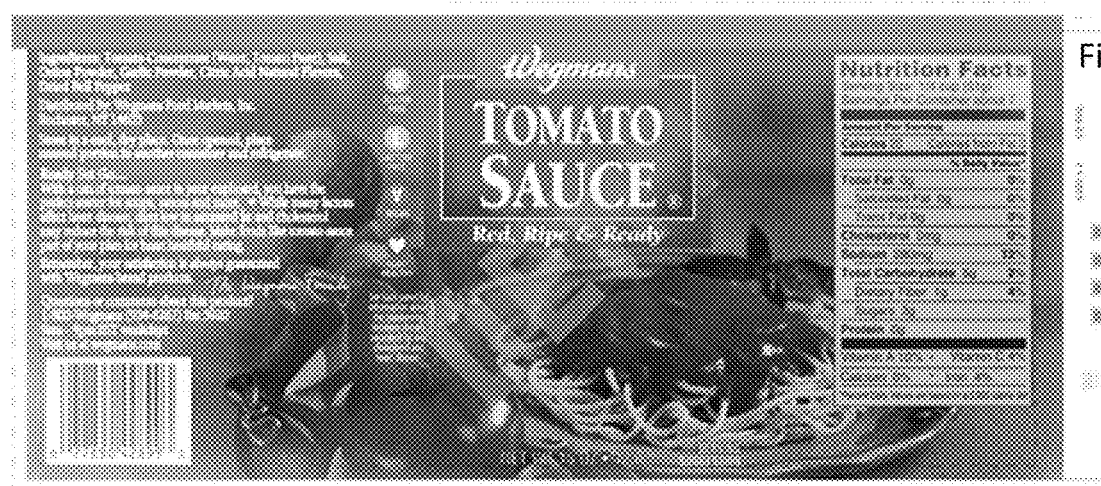
FIG. 12 shows a robustness image where color indicates higher probability of digital watermarking being read and grey indicates a lower probability of the digital watermarking being read.

1. Convert the original digital watermarked image in FIG. 9A to greyscale.
2. Modify the greyscale image's opacity to some percentage less than 100%, e.g., to between 20% and 95%, to between 40% and 80%, to between 50% and 70 percent, etc.
3. Overlay the modified greyscale image onto a white (or lightly colored) background. (FIG. 10 shows a greyscale version of FIG. 9A with 50% opacity overlaid onto a white background.)
4. Mask the original embedded image using a robustness map indicating the robustness of the digital watermarking at each pixel, groups of pixels or image areas in the original image. FIG. 11 shows a result of the original watermarked image FIG. 9A masked using the FIG. 9B robustness map. The resulting white areas in FIG. 11 correspond to the black areas in FIG. 9B, e.g., those have low or no watermark robustness.
5. Overlay the masked image (e.g., FIG. 11) on top of the modified greyscale image (FIG. 10). FIG. 12 shows the result of this overlaying. This final robustness image (or "signal detection map") indicates those areas having a high probability of digital watermark detection in original design color and indicates in grey those areas having a low (or relatively lower) probability of the digital watermark detection.

Such a result (e.g., FIG. 12) provides a designer with a practical and visual example of how a package will be machine-read, including a more realistic design presentation compared, e.g., to the FIG. 7 heat map. Thus, this signal detection map (FIG. 12) is helpful to see where the digital watermark is strong (by showing the original design color) and where it is weak (shown in grey or other color); and it also allows inspection of modification artifacts (e.g., signal embedding artifacts) to be assessed directly on signal detection map itself.

Figure 13:
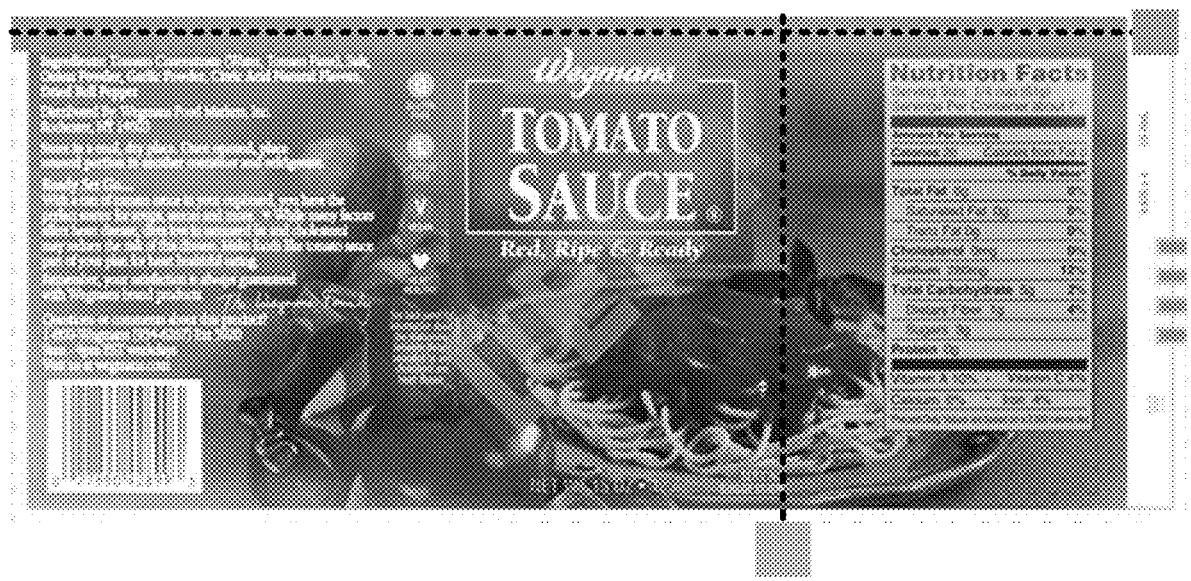
FIG. 13 shows the robustness image of FIG. 12 including horizontal and vertical swipe probabilities.

In some implementations, we add a swipe component to the FIG. 12 final robustness image. That is, we provide horizontal and vertical swipe information (like in FIG. 7) to allow a designer a fuller picture of how the digital watermarking will be read by a scanner. For example, FIG. 13 shows horizontal (grey result) and vertical (color result) swipe information. The resulting swipe information can, e.g., keep with the final robustness image color scheme (e.g., grey for hard to read areas and original color for detectable areas). Or the resulting swiping information can be a totally different color, e.g., red for stop, no good; and green for good to go, etc.

While we have used specific colors to represent various results (e.g., original color=robustness, grey=no or less robustness) other colors can be used instead. For example, white or black can be used for low/no robustness areas.

IV. DETECTING MULTIPLE DIFFERENT CODES WITHIN IMAGERY

The presence of multiple, different encoded signals (e.g., steganographic codes, barcodes, etc.) in imagery can sometimes create havoc, e.g., in the retail packaging space where a consumer is typically charged according to the presence of a code. Take an easy example of a 2 different 1D barcodes printed on a box of cereal, with the first 1D barcode corresponding to a box of "Sugar O's" and the second 1D barcode corresponding to a box of "Honey Sugar O's". A consumer at checkout could be charged twice (once for a box of Sugar O's and another for a box of Honey Sugar O's) if both of the 1D barcodes are scanned, even though the consumer only intended to purchase 1 box of cereal. The consumer gets charged twice, and a retail store's inventory management system now has erroneous information.

Now consider some progressively harder examples. In a first case, a box of cereal includes an encoded signal redundantly covering some or a majority of the surface area of a box of cereal. Each instance of the encoded signal carries a payload, e.g., UPC payload 1. Examples of encoded signals may include, e.g., steganographic encoding or digital watermarking, or some other encoding scheme. The cereal box also includes a 1D UPC barcode. The 1D UPC barcode also carries UPC payload 1. No disagreement between the 1D UPC barcode code and the encoded signal code, so the consumer is only charged once. (See, e.g., assignee's U.S. Provisional Patent Application No. 62/322,193, filed Apr. 13, 2016, which is hereby incorporated herein by reference in its entirety, for related solutions for conflicting/similar codes including wait times between decoded codes.)

In a second case, each instance of the encoded signal carries the same payload as above, UPC payload 1. The UPC 1D barcode, however, is different and conveys UPC payload 2. Here, a conflict exists and a retailer runs the risk of charging a customer twice. Moreover, the conflict between encoded signal and the 1D barcode may indicate a larger problem, e.g., a manufacturing issue such as mislabeling or a wrong product altogether.

In a third case, various different encoded signals are provided on the package, with a first encoded signal including UPC payload 1, and a second encoded signal including UPC payload 2. A conflict results here again.

It's imperative that such conflicts are discovered early in the design process, preferably before printing and distribution.

Let's look at a typical workflow for a product package. For example, a workflow may include one or more of the following steps:

1) Receive digital package files from, e.g., via a secure FTP.

2) Pre-Flight to determine that we have all info. Pre-flight is a term used to describe a preliminary step that evaluates received information, and may include reformatting, decompressing files, and an overall evaluation whether the received digital page files can be assembled into a printable package. Package artwork is typically represented by a collection of files in a variety of different formats e.g., Bitmaps (*.tiff, *psd, etc.), vector imagery (*.ps, *.ai, etc.), and fonts (*.abf, *.ttf, etc.). A final rendered packaged can be "built" using the aforementioned files using a variety of different strategies, from a 1-layer bitmap to numerous layers of vector and bitmap imagery utilizing multiple fonts.

3) Enter Package/Retailer/Printer/Supplier in CRM system, e.g., Microsoft Dynamics CRM (not shown). Optionally, the materials may include an XML file which can be used to automatically enter the information. In this case, a manual check will help ensure accuracy.

4) Assign to Teams. For example, different tasks can be assigned to different work stations, or to available operators. An operator queue can be examined to determine availability.

5) Create an identity file in an identity management system (e.g., housed in the cloud) and associate the GTIN. The creation and management of these services can be accomplished through a web-portal to the identity management system or programmatically through Web APIs. If the packaging materials includes a 1D barcode number, e.g., in a GTIN format, this information can be obtained and provided as used as the encoded signal payload or part of a payload, or to a storage location at which an encoded signal payload will point to.

6) Review Files—Different Classifications. These classification may include assignment of package embedding difficultly. This may prompt additional resources or billing requirements.

7) Print-out Initial Client Proof.

8) Embed encoded signal.

9) Print Watermarked Proof

10) Test on POS Scanner. This is a preliminary test to see if the proof will read.

11) Assemble Package for Manual Test

12) Manual Test. This can be a detailed process, where each package face is tested, e.g., at different reading angles. For example, each side is tested on a POS scanner with a vertical camera and a horizontal camera. The package is passed over the scanner, e.g., 2, 4 or 8 times per side and then number of reads is recorded. The side is rotated, e.g., 90 degrees and the process is repeated for that side, rotated again and retested, etc. Each package side can be so tested and the results recorded. A grade can be assigned based on successful reads. Of course, the process is benefited from automation where a package is passed in front of a scanner, e.g., with a robot arm, conveyor belt or some other movement mechanism.

13) Complete QC Checklist 13a) compare results of digital grade and manual grade; decide whether to accept or refine embedded package.

14) Send Approved file to Customer or Printer via FTP

15) At the Printer, enter file into system (e.g., ESKO Packaging Management software, provided by ESKO, with offices worldwide including in Miamisburg, Ohio 45342 (USA)).

16) Various ink and printing pre-checks.

17) Ready the file for printing plate manufacture, including allowing the client or pre-press designer a final review (e.g., 1-bit .tif file) review. Approval or change request received.

18) Plate manufacture (e.g., for an offset press) based on the design file.

19) Print run—print the design file.

So how do code conflicts surface? For example, in step 5 an encoded signal preferably duplicates a provided GTIN payload from a 1D barcode.

A few sources of conflicts may include, e.g., operator error (erroneous data entry), using the wrong 1D barcode file, etc. At the printing press stage (e.g., steps 15-19), product design families may be associated in a packaging management system. A product design family may include, e.g., a line of dish soap which includes related designs, with some design elements being identical and others being unique. For example, the background across the family designs may include a design element in a Cyan color channel that doesn't change from family member to family member. Yet, each family member may include other design elements that are unique (e.g., color changes to reflect dish soap fragrance). In this dish soap example, the printer may realize an advantage by reusing the common Cyan element printing plate across the entire family. If the common plate is manufactured based on a first design file, with a first encoded signal represented in the first design file, then each package printed with this plate will include the first encoded signal in the common plate area (e.g., background). But if each family member includes a unique GTIN to represent that it's a different product than the family, and other printing plates are manufactured for these unique design elements and unique GTIN, each family member will also include different encoded signals. So a package printed with the common Cyan plate (including the $1^{st}$ encoded signal) and a unique family plate (e.g., including a $2^{nd}$ encoded signal) will have at least two conflicting codes printed thereon.

If these types of code conflict problems are discovered after printing, the printer or customer may lose tens of thousands of dollars, if not more.

We have developed a "scanner verifier" to help catch such potential code conflicts before printing plate manufacture, or before complete print press runs. Thus, the scanner verifier can be used prior to printing plate manufacture (e.g., just prior to step 18, above) or as the first sheets start rolling off the presses in step 19.

The scanner verifier preferably includes a plurality of code detectors. For example, it may include a signal decoder, e.g., as discussed relative to FIGS. 15 and 18 and a barcode decoder, e.g., a 1D and/or 2D barcode decoder.

Suitable 1D and 2D barcode decoders include, e.g., the open source ZXing ("Zebra Crossing") barcode project. Of course, other 1D and/or 2D barcode decoders could be used instead. The ZXing barcode decoders support 1D product codes (UPC-A, UPC-E, EAN-8 and EAN-13), 1D industrial codes (e.g., Code 39, Codabar, etc.) and 2D codes (e.g., QR Code, Data Matrix, etc.). The ZXing source code can be obtained at https://github.com/zxing/zxing/releases. The ZXing decoder is configured to accept scanline data. (A scanline includes a row of image data, e.g., pixel values or binarizied versions of the pixel values.) How the scanlines are generated, however, is left to the implementation.

The scanner verifier also preferably includes a code comparator and a display generator.

Figures 21A, 21B:
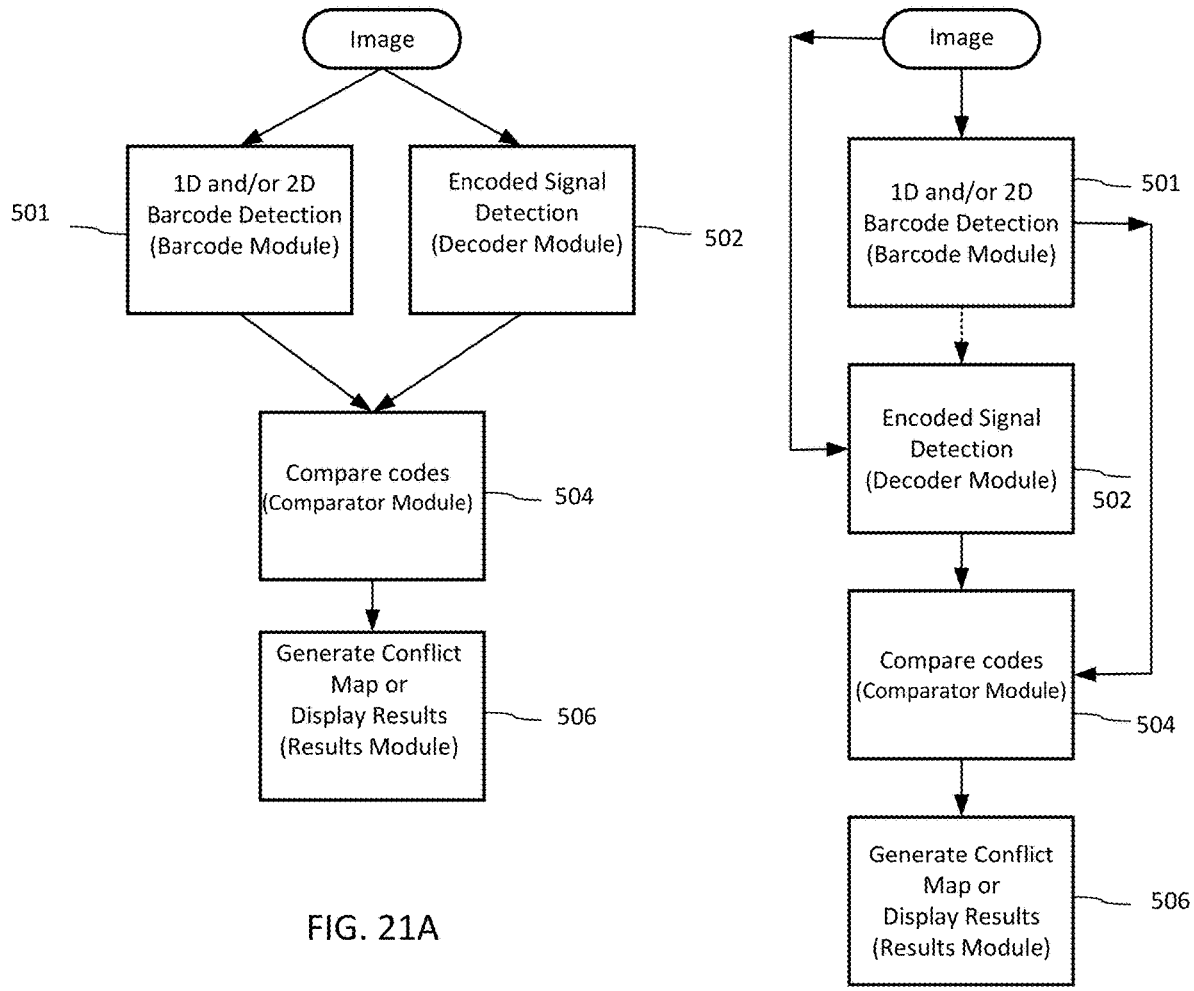
FIGS. 21A and 21B are block diagrams for code conflict detectors.

A scanner verifier is discussed further with reference to FIGS. 21A and 21B, where an image, e.g., from a design file or from a scanner (e.g., a scanned sheet from a print run) is analyzed in parallel (FIG. 21A) or in series (FIG. 21B). A barcode module 501 analyzes the image to determine whether it contains a barcode, and if so, decodes the barcode and provides the barcode's payload (e.g., representing a GTIN number) to a comparator module 504. Barcode module 501 will also determine whether the image includes two or more barcodes (e.g., a 1D and a 2D barcode). Each barcode payload can be provided if found, optionally along with a spatial image location of the barcode(s). The image is also analyzed by a Decoder Module 502 (also called a "Decoder" in this Section IV) to detect and decode encoded signals. For example, the Decoder Module 502 can be configured as a steganographic or watermark decoder. The Decoder Module 502 outputs a decoded code (e.g., representing a GTIN number), optionally along with a spatial image location for each decoded code, to the Comparator Module 504. The Comparator Module 504 compares payloads from both the Barcode Module 501 and the Decoder Module 502, to see if they match and/or whether there are any code conflicts. The Comparator Module 504 can be configured to compare plural codes from each of the Barcode Module 501 (e.g., compare a 1D with a 2D code) and the Decoder Module 502 (e.g., compare a $1^{st}$ decoded signal and a $2^{nd}$ decoded signal), and between all codes regardless of decoder source.

The Comparator Module 504 can output the codes and one or more conflict indicators for display or for a report. The conflict indicators can indicate, e.g., no conflict or information regarding the code conflicts.

Results Module 506 can create information for a graphical user interface for display. Different colors, boxing and/or highlighting can be used to show results of the conflict comparison.

Returning to the Barcode Module 501, scanlines are provided from data representing the image for 1D barcode analysis. For example, data representing the image may include a greyscale or binarizied version of the image. Scanline production and management may be controlled by a Barcode Module 501 sub-module or a different module altogether (a "scanline generator module"). The scanlines typically represent 1 or more pixel row(s) of image data. In some cases, we combine adjacent (top and bottom) scanlines together (e.g., with an AND function) to form a single scanline. A scanline's length can vary, e.g., in one implementation the scanlines are 4 inches long. This means that for a 300 dpi image, a single scan line will contain 1200 pixels. In some cases the scanlines can be overlapped, e.g., 25-75%. For example, a first scanline from a first image row is four inches long and starts at point (0",0"), with the top left corner of the image being the origin, and ends at (4",0"). The $2^{nd}$ scanline starts at (1", 0") and runs to (5", 0") and so on. If reading a horizontal barcode, the scanline generator module can provide scanlines along the first image pixel row, then skip down the image if no barcode is found. For example, the next scanline may be 10, 20 or 50 rows down the image. The scanline generator module can continue to skip down the image until a barcode is read, or until it reaches the bottom of the image.

If the Barcode Module 501 detects and decodes a barcode from a particular scanline, the scanline generator module preferably provides scanlines from the next n number of rows (n being an integer) below the successfully read scanline. For example, scanlines from the next 3 rows, 5 rows, 10 rows or 20 rows are analyzed to get a read. The Barcode Module 501 can be configured to only output a code if all of the n scanlines (or a predetermined subset of the n scanlines) also generate the same code.

The scanline generator module can also be configured to provide vertical scanlines by using image columns instead of rows. This will help find a barcode that may be rotated at a 90 degree angle within the imagery. Additionally, off-axis (e.g., 45 degree) scanlines can be generated and provided to the Barcode Module 501 for analysis.

Returning to the Decoder Module 502 (also referred to as "Decoder"), the Decoder can be configured to analyze multiple different color separations (or planes) from the image. For example, the image may include Red (R), Green (G), Blue (B) separations or may include Cyan (C), Magenta (M), Yellow (Y), Black (K) separations. The image may also include Spot Color 1 and Spot Color 2, etc. The Decoder can be configured to analyze each of these separations separately looking for encoded signals. In some cases, separations can be combined, perhaps with various weights, to represent, e.g., chrominance (e.g., R-G; or 0.5R-0.5G) or Luminance (e.g., R+G+B; or 0.2126*Rlinear+0.7152*Glinear+ 0.0722*Blinear, for Luminance (Y linear) in the sRGB specification). The Decoder can then analyze the Chrominance and Luminance channels in search of encoded signals.

Figure 19A:
FIG. 19A shows an image segmented into blocks for decoder analysis.
Figure 19B:
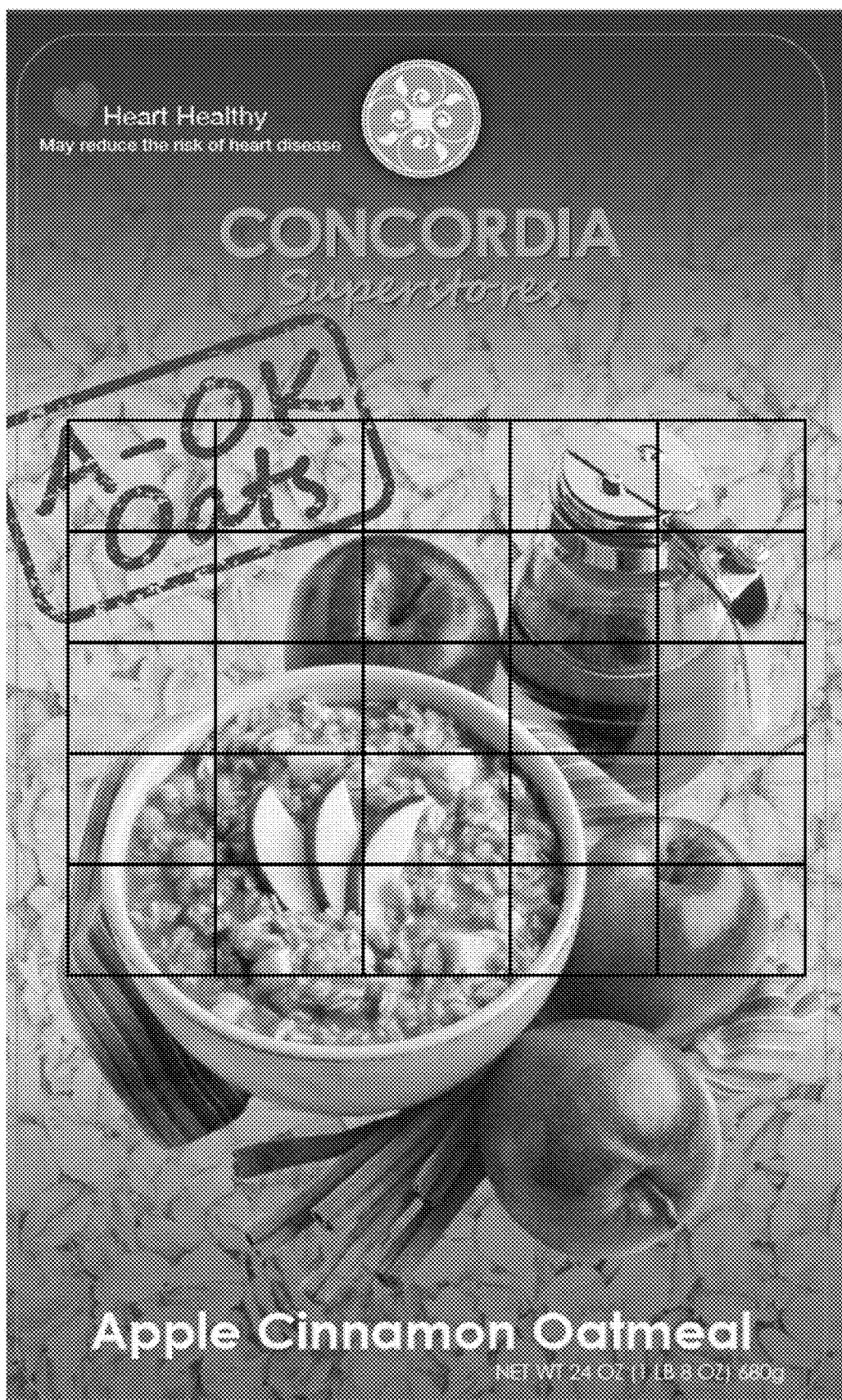
FIG. 19B shows the FIG. 19A image including a smaller blocked area for decoder analysis.

In one implementation, the Decoder is configured to analyze image blocks or tiles. With reference to FIG. 19A, an image is segmented into blocks, e.g., 512×512 or 128× 128 pixel blocks. (The Decoder may down-sample (or up-sample) the blocks to achieve a native encoded signal resolution. For example, a 512×512 block may be down-sampled to a 128×128 block or tile.) While we prefer to block out the entire image as in FIG. 19A, in some cases only a portion of the image is blocked out (FIG. 19B). These blocks can be used for all separations in the image, e.g., the Yellow separation is blocked in the same manner as the Magenta and Cyan separations, etc. In alternative implementations, each separation or groups of separations are blocked separately.

Each block (or a subset of blocks) from each separation can be analyzed by the Decoder to determine whether that block contains an encoded signal code and, if so, may associate the code with a particular block or image spatial area. For example, the blocks can be numbered, tracked or assigned to a spatial location within the image. The code can be assigned to the numbered, tracked or assigned block from which it was decoded, or otherwise assigned to an image spatial area. For example, and with reference to FIG. 19C, the Decoder operates on blocks from one separation (e.g., Magenta or Chrominance) from the FIG. 19B drawing, and may assign decoded codes to spatially oriented blocks. In all likelihood, the results will be stored in a table or memory structure, along with some spatial indicator. (Of course, the Decoder could operate on all image blocks instead, e.g., as from FIG. 19A.) In this example, an encoded signal (ES1) is detected in the majority of blocks as shown in FIG. 19C. The Decoder did not find an encoded signal in three (3) of the blocks, nos. 8, 17 and 19, so these blocks are illustrated as empty. (The Comparator Module 504 would not find a code conflict in this FIG. 19C separation since all of the decoded codes include the same code ES1, e.g., which may correspond to a GTIN number.)

With reference to FIG. 19D, the Decoder operates on another image FIG. 19B separation (e.g., Cyan or Luminance). An encoded signal (ES1) is detected and decoded in the majority blocks, but a second encoded signal (ES2) is detected and decoded in two (2) blocks, e.g., block nos. 14 and 19. No encoded signal is found in two (2) of the blocks, nos. 8 and 17, and are illustrated as empty. (The Comparator Module 504 would find a code conflict within this separation since two different codes, ES1 and ES2, are decoded. Additionally, the Comparator Module 504 may indicate a conflict between the two separations, the first having an ES1 in block 14, while the second has an ES2 in block 14.) The Decoder can operate in the same manner on all separations and channels associated with the image.

Figure 19E:
FIG. 19E represents the FIG. 19D instance, relative to a 1D barcode comparison.

With reference to FIG. 19E, the Comparator Module 504 can be configured to compare each of the decoded codes (e.g., ES1 and ES2, from all separations) with any associated 1D and/or 2D barcode codes. For example, in the illustrated example, a 1D barcode is recognized and decoded by the Barcode Module 501, and the results are provided to the Comparator Module 504. The 1D barcode's code carries the same ES1 code in this example. The Comparator Module 504 notes a conflict in blocks 14 and 19, since those blocks (in various separations) include an ES2 code that is different than the 1D barcode's ES1 code. This conflict can be noted and reported to the Display Module 506.

The Display Module 506 may be configured to provide output such as a "conflict map." The conflict map may include, e.g., a report, color information, information for spatial display, or highlights for those image areas including a conflict. Display Module 506 output can be provided to a display screen. A conflict map can be shown by boxing or highlighting the relevant image blocks. In some cases, a text overlay is provided in the blocks' relative spatial position in the imagery noting the ES2 code or other text indicating a conflict. In still other cases, the conflict boxes are shown with an opaque overlay, or in gray instead of in color. Non-conflicting blocks, e.g., those blocks corresponding to the 1D barcode's code, can be shown in original image colors, and/or with text overlays (e.g., indicating an "OK" or "√" symbol or text showing the ES1 code). The text overlays can be color-coded to indicate "all clear" (e.g., green) or "conflict" areas (e.g., red).

Now with reference to FIG. 20B, the Display Module 506 may be configured to control display of additional and/or alternative information. The information can be displayed on a display such as a computer monitor, touchscreen display, smart phone screen, TV monitor, etc. The Decoder Module 502 operates on all separations for the image blocks noted in FIG. 20A. In the illustrated example, the Decoder Module 502 decodes two different encoded signal codes, ES3 and ES4. No codes are found in blocks 1, 3, 9, 18 and 19, so these blocks are illustrated as being empty. The ES3 codes are only found in blocks 2, 4, 7 and 12, whereas the ES4 code is found in various other image areas. The Barcode Module 501 determines that the image includes a 1D barcode in block 15 carrying an ES4 code, and a QR code in block 25 carrying a similar but different code relative to the ES4.

The Comparator Module 504 is configured in this example so that conflicts between the 1D barcode (carrying an ES4) and any other codes are flagged. So a conflict is noted for block nos. 2, 4, 7, 12 and 25. This information can be provided to the Display Module 506, which can create a conflict map, e.g., an overlay of different colors (as in FIG. 20B) for the conflicting areas, perhaps relative to the original image shown in FIG. 20A. Instead of overlaying colors, the respective areas may be displayed or highlighted with a graphic box, highlighting, colored shape or outline. In some cases the empty areas (e.g., those areas including no codes) are represented on a display as a grey or grayscale. This shows that no encoded signal (or an encoded signal with a low signal strength as discussed above in Sections II and III) was found in the respective image areas. Additionally, the robustness maps discussed above can be combined with a conflict display map. This will provide a complete picture for a printer or designer, e.g., showing robustness levels (perhaps with swipe information) and any code conflicts.

Graphical text boxes (and corresponding different colors) 27 can be provided by Display Module 506, or included as part of a conflict map, for display on a display screen. For example, the UPC and ES4 codes are shown in yellow since they have matching codes, while the ES3 and the QR codes are shown in different colors since they both conflict with the 1D barcode's code and with each other.

FIG. 20B can be viewed as a conflict map or information supporting a conflict map. The map may reveal information about conflicting separations. For example, the ES3 code corresponds spatially with the castle and sundial in FIG. 20A. This may give a proofer or printer an idea of where the conflict originated. For example, the Valiant Heavy Duty Hand Soap may belong to a family of soaps, each of which includes the castle and sundial in the design. The different code (ES3) may have resulted since the castle and sundial were pulled from a different family member and used in this case. Thus, a conflict map may be used to find origins of conflicting codes.

Of course, the functionality of the various modules in FIGS. 21A and 21B can be combined into one or more modules, including one or more sub-modules. For example, the Comparator Module 504 and the Results Module 506 can be combined into a single module, as can the Barcode Module 501, Decoder Module 502 and Comparator module 504.

V. FURTHER IMPROVEMENTS

By convention, digital watermark signal blocks are commonly tiled across an artwork, with an upper left corner of a first signal block placed in the upper left corner of the artwork. Tiling proceeds based on this upper left anchor, or origin point.

Applicant has discovered that this convention can sometimes make it more difficult to detect mis-marking of multi-layer artwork (e.g., for retail product packaging) with a different steganographic digital watermark in two or more layers, encoding two or more different GTIN identifiers. Such placement convention makes the calibration signal of an erroneously-included second watermark signal spatially-coincident with the calibration signal of the intended first watermark signal. The two calibration signals are aligned.

In such case, quality assurance (QA) checking of the composite artwork (or of a sample package from a test print run) with a watermark detector, finds a single calibration signal. The detector may proceed to extract a first of the two payload signals in preference to the other, e.g., due to unique features of the host artwork that makes one signal slightly dominant. Thus, the second watermark may escape detection in QA. However, when imaged by a scanner of a store's point of sale (POS) system, under different conditions (e.g., when the printed artwork is imaged with perspective distortion, possibly with illumination that varies across the packaging), the second watermark may be detected—at least in one block of the captured image. If one watermark block conveying the first watermark is detected, and a second watermark block conveying the second watermark is detected, both within the same image frame, the POS system may tally two items when only one is being purchased, leading to the earlier-noted double-charging problem.

To address this problem, applicant has found it desirable to avoid using a consistent origin for all watermarks. Instead, to the extent possible, different watermarks should have different origins. If a watermark block has 128×128 elements, there are 16,384 unique origin points that can be defined within the element coordinate system.

According to one particular aspect of the present technology, the origin at which a tiled array of watermarks is positioned in an artwork is assigned randomly. In a related aspect, the origin is selected based on the watermark payload, or other parameter that may vary package-to-package. By such arrangements, it would be exceedingly rare for an erroneously-included second watermark to have with an origin coincident with that of an intended first watermark. With offset (non-coincident) origins, the existence of the second watermark is more likely to be discovered during QA checking, since its presence is not camouflaged by a coincident first watermark.

In the second arrangement, in which the origin is determined based on the payload of the watermark, any function that assigns different ones of the 16,384 possible origin points, to different payload values, can be used. One option is to represent the numeric value of the watermark payload in modulo-16,384 form, with the result determining the watermark origin. Another is to hash the watermark payload to yield a value between 1 and 16,384. The hash can be designed to lack a locality property, so that adjoining payload values do not necessarily lead to adjoining watermark origins. The artisan will recognize numerous other techniques for mapping watermark payloads to origin positions.

Additionally or alternatively, watermark scale can also be varied. Watermark detectors are robust to a wide range of scale states, so watermarks can be embedded at various physical sizes and still be detected. Thus, in accordance with another aspect of the technology, the scale at which a watermark is embedded can be varied over a permissible range, e.g., randomly, or based on the watermark payload.

In addition to varying the origin and/or scale of watermarks, or as an alternative, watermark rotation can also be varied. Watermark detectors are invariant to rotation, so watermarks can be embedded at arbitrary rotations and still be detected. (Sometimes it is preferable to restrict the possible watermark rotation, relative to other artwork/printing on the package, to one of four states: 0, 90, 180 and 270 degrees.)

Thus, in accordance with a further aspect of the technology, the rotation at which a watermark pattern is embedded is selected randomly, or based on the watermark payload or other parameter that varies with the package.

As noted, the risk of a second watermark being erroneously included in packaging artwork is greatest when first and second different packages have artwork elements in common. For example, a supermarket's private label soft drink may be available in both lemon and lime flavors. The artwork for both may have many elements in common, such as the logo and other artwork. A printer may be tempted to re-use a printing plate for the lemon drink when printing cans for the lime drink since—to human inspection—the artworks for the two drinks, on a particular printed layer, may look identical, when in fact they may be encoded with different watermark payloads (conveying different product GTINs). Products that have such artwork in common may be considered "brand-mates."

Since the number of possible watermark pattern rotation states is often practically limited to four (0, 90, 180, and 270 degrees), and the number of possible scale states and origin locations are also finite, special efforts may be made to vary these parameters within brand-mate families, to ensure that a particular parameter set is not duplicated. Artwork for a lemon flavored soft drink may be embedded at a watermark rotation of 0 degrees. Artwork for a lime flavored brand-mate may be embedded at a watermark rotation of 90 degrees. By identifying a family of brand mates, and varying one or more of these watermark parameters among different products within the family, the most common cases of plate confusion can be addressed.

As noted in connection with varying watermark origin, varying watermark rotation and/or scale also makes it less likely that a second watermark that is erroneously included in artwork for a product will go un-detected during pre-press or test-print QA, since the different rotation/scale of the second watermark will make it more conspicuous to a watermark detector.

We earlier discussed a Message Strength metric that was derived by decoding a watermark payload from image data, using the payload to re-create the original embedded bit sequence used for the watermark (including encoded bits from error correction coding), etc.

A related approach can be used to reveal a second watermark that might be obscured or otherwise made less detectable in host artwork by the presence of a first watermark.

In accordance with this aspect of the technology, the first watermark is decoded from encoded artwork (e.g., from an image captured from printed packaging by a POS scanner). Its payload is used to re-create the original embedded bit sequence used for the watermark (including encoded bits from error correction coding). From this bit sequence, a corresponding "pristine," watermark block pattern is derived, e.g., with 16,384 elements having one of two binary values encoding the bit sequence.

We would like to remove the influence of this block pattern from the captured image, so that any second watermark that may be present might become un-obscured, and detectable. However, the just-computed block pattern is preferably not directly subtracted from the artwork because the encoding process typically adjusts the local values of the pattern in accordance with local image characteristics, per a model of human visual perception. (E.g., the watermark pattern may be added at a stronger amplitude along an edge, or in a "noisy" image region, than in a region characterized by nearly-uniform pixel values.) Additionally, the processes of printing and scanning introduce further noise into the captured image, further causing the computed block pattern to not perfectly match the watermark signal found in the scanner-captured image.

To find a counterpart of the first watermark block pattern that should be subtracted, taking into account such variations, a dot product operation can be computed between the re-created "pristine" watermark block pattern, and a version of the captured image from which the visible artwork has been attenuated (e.g., as by a Wiener filter). The dot product operation gives an indication of the strength of the pristine watermark pattern at different locations in the captured image. The pristine watermark is then locally weighted by corresponding dot product values, to yield an estimate of the watermark signal as actually present in the captured image. This counterpart of the watermark signal (i.e., the estimated watermark signal) is then subtracted from the captured image, yielding a first-watermark-attenuated signal. (Before subtraction, this counterpart watermark block should also be transformed, per affine parameters discerned during decoding of the first watermark image, so that its scale, translation, origin offset, etc., match that of the captured image.)

This first-watermark-attenuated signal is applied to a watermark decoder, to learn if the decoder can now find a second watermark present in the captured imagery. If so, the artwork can be flagged as faulty, and remedial steps can be taken to print artwork without the errant, second watermark.

If a second watermark is thereby found, there's a chance that there may be a third watermark. The just-described process can be repeated to similarly remove an estimate of the second watermark from the captured imagery, yielding a first-and-second-watermark-attenuated signal. This signal can be submitted to the watermark decoder to determine if a third watermark is present. Such processing can be continued until all watermarks have been detected, and estimates thereof have been removed—leaving a counterpart of the captured image from which no watermark can be decoded.

The reference (calibration) signal of the first watermark can be similarly estimated and removed. If the second watermark is coincident with the first watermark, the scale, rotation, and other affine transform parameters derived from the calibration signal of the first watermark apply equally to the second watermark, and can be re-used when attempting detection of a second watermark. Thus, the calibration signal of the first watermark can be removed prior to searching for a second watermark. (If the second watermark has a different origin, scale or rotation, its respective calibration signal will persist through subtraction of the estimated first watermark—including the first calibration signal.)

In a variant embodiment, instead of removing the estimated watermark signal from the artwork-attenuated frame of image data, such process can alternatively be performed based on the raw bits of demodulated data. Demodulation is the process that transforms the physical data (e.g., across 16,384 locations of a watermark block) to raw bit data, which is then fed to an error correction decoder to recover the original message bits. Performing the dot product operation at this stage involves less data manipulation. (The dot product gives an indication of the strength of each of the raw bits, relative to its pristine version, at each bit position in the bit-string, within the captured image.) However, the set of data resulting after subtraction of a dot product-weighted set of "pristine" raw data, from the raw data obtained from the image, only aids in revealing a second watermark that is coincident with the first watermark (i.e., same affine parameters).

In one particular embodiment, the just-described procedures are employed in a forensic QA operation. Such an operation may exhaustively analyze a frame of imagery captured by a point of sale scanner, e.g., examining each different 128×128 pixel patch within the captured frame (which frame may be 1280×1024 pixels in size) for a watermark. If one watermark is found, its influence is attenuated as detailed above, and the resulting patch is examined for presence of a second watermark. After the possible candidate patches, anchored at different origin points within the image frame, are examined in this fashion, the process can be repeated with second, third and further frames of captured imagery.

In still another arrangement, Viterbi decoding techniques are applied to imagery captured from a test print of product packaging, to discern the presence of multiple watermark payloads.

Uses of Viterbi methods in watermark decoding are detailed, e.g., in applicant's patent publications 20020159614 and 20030081810, and pending application Ser. No. 15/145,784, filed May 3, 2016. Normally, Viterbi decoding is employed to identify the most likely watermark payload (bit sequence) represented by pixel data. Such payload is checked with CRC-like process to confirm its validity, and if it passes the validity check, the payload is output as the final watermark data.

In accordance with this aspect of the present technology, instead of examining only the most likely watermark payload for validity, the N most-likely payloads are each examined for validity. (N may be 2, 5, 10, etc.) If any of these alternate payloads passes the CRC-like checking process, it indicates a second (or further) watermark. In such case, the package fails the QA check, and remedial action is taken to investigate the extra watermark payload(s).

(The just-described method assumes the two watermarks have the same affine parameters: rotation, scale and origin translation.)

Erroneous inclusion of a second watermark (again through, e.g., a second watermarked color separation or printing plate) can also be discovered by logically associating together the separations or plates that are intended to be used together, so that an unexpectedly-included separation/plate can be recognized. To aid in such logical association, the payload with which artwork is encoded can include more than just, e.g., the GTIN of the product being marked. It can also include a field of data used to associate that watermarked layer with some or all of the other layers with which it is intended to be printed.

For example, a function can be applied to combine-together layer-identifiers for others of the layers with which a watermarked layer is to be employed, to yield a sort of checksum that is included in the payload of the watermarked layer. (Summing the identifiers, and taking the N least significant symbols is one approach.) During pre-press, or test-print Q/A, the checksum can be recovered from the decoded watermark, and compared against an independently-computed checksum determined from the identifiers of the layers with which the watermarked layer is bring printed. If the computed value does not correspond to the watermarked value, something is amiss.

In a related arrangement, a printed indicia, positioned along a margin of flat packaging—out of sight after assembly, is composed of elements contributed by each separation/plate in a set. If one of the intended separations/plates is missing, the printed indicia is incomplete.

The printed indicia formed in this manner can be a machine-readable code, which becomes unreadable (or yields wrong output data) if one of the intended plates/separations is omitted, or if an additional plate/separation is wrongly included. In one embodiment, the code is a color code of the sort detailed in published patent applications 20060104475 and 20050285761 to Microsoft. In another, the code is a conventional 1D or 2D (e.g., QR) code, albeit likely composed of elements of different colors. The code elements can be selected/arranged to encode an identifier associated with the correct grouping of plates/separations, such as the GTIN of the associated product, or a hash based on the GTIN. In a QA operation, the resulting code is imaged by a camera-equipped reader device, and decoded to confirm that its payload is decodable, and corresponds in an expected manner with the intended group of plates/separations.

Discovery of a package bearing two watermarked product identifiers can also take place in the scanner, e.g., at a retail checkout. In one such an arrangement, if two identifiers are decoded in a single frame of captured imagery, the scanner passes neither to the POS terminal, but instead logs the two identifiers (GTINs) in a "blacklist." This list is checked each time a watermark is decoded, and if a decoded identifier is found on the blacklist, it is not reported to the POS terminal. No confirmatory "beep" indicating a successful read is issued. The checker (or customer) will then re-swipe the product.

The re-swipe will not lead to a watermark-based product identification, as the identifiers are now on the blacklist, so a "beep" will again not issue. At this point, the checker will resort to the old method of turning the 1D black/white barcode to the scanner. When this barcode is sensed and decoded, its identifier will be passed to the POS station, and the item will be tallied.

Figure 22:
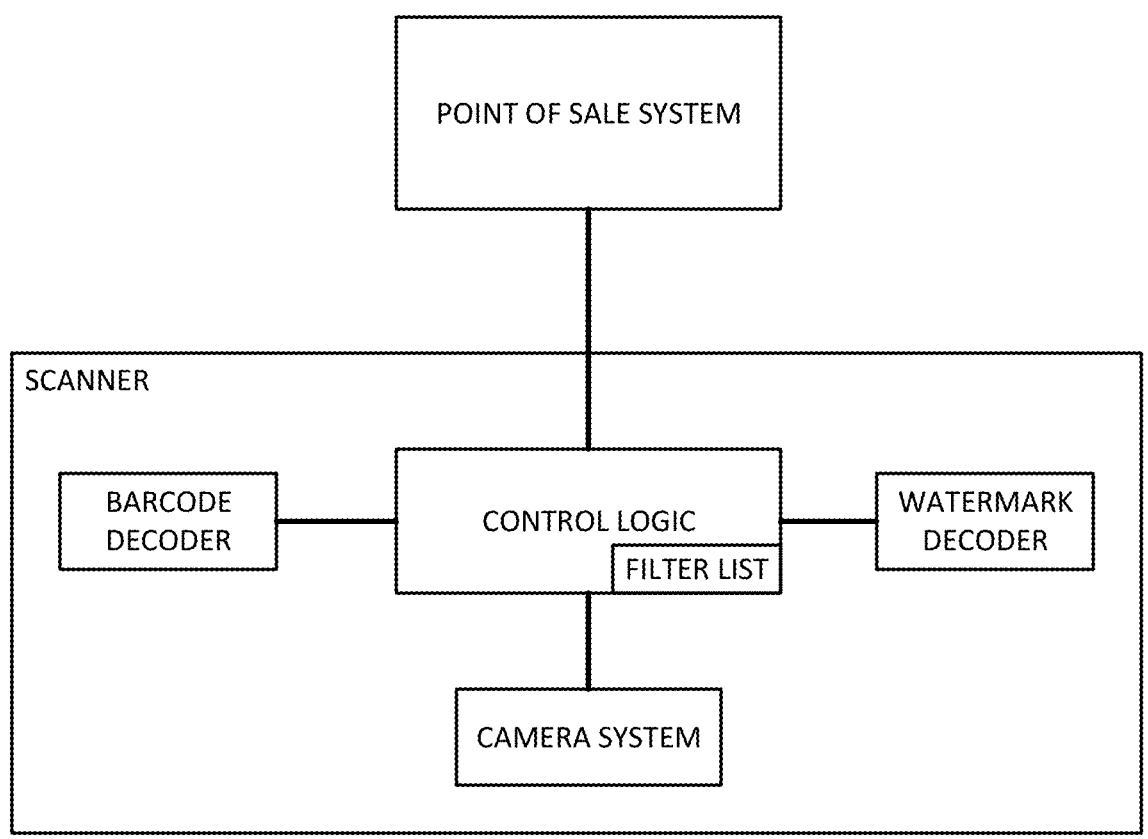
FIG. 22 is a block diagram of a scanner coupled to a point of sale system.

FIG. 22 is a block diagram depicting a scanner that includes such a blacklist. (The blacklist is maintained by control logic that also performs the other functions described herein, such as controlling passage of GTINs reported by the barcode and watermark decoders to an associated point of sale system.)

In a variant embodiment, the conflicting watermarked GTINs need not appear in the same frame. Blacklisting occurs if the conflicting GTINs are decoded within a threshold number of frames (e.g., 5), or a threshold interval of time (e.g., 200 milliseconds) of each other. (GTINs that are decoded within such frame or time interval—whether decoded from black and white barcode or digital watermark—may be termed "proximate" GTINs. If they are conflicting, they may be termed "proximate but conflicting" GTINs.)

This protocol can also be extended to the case in which a conventional 1D barcode is found to encode a GTIN that conflicts with the GTIN of a proximate watermark. That is, if any proximate but conflicting GTINs are identified—regardless of whether they are conveyed by 1D barcode or watermark, any watermarked GTIN involved in such conflict is added to the watermark blacklist. (There may be more than one.)

It will be recognized that such arrangement may sometimes lead to a single product being mis-tallied. Consider a situation in which a watermarked GTIN is decoded, by itself. Its GTIN is passed to the point of sale terminal and added to the checkout tally, as is the normal operation. However, if two or three frames later (but still proximate), a different GTIN is decoded from a barcode, a case of proximate but conflicting GTINs has arisen. In such case, the second-decoded identifier from the barcode is not added to the tally, and the watermarked GTIN earlier decoded and reported to the point of sale system is now added to the blacklist. The tally includes the first-identified product, but not the second. If the first identification is errant (e.g., due to inclusion of an improper plate or separation in the printing process), the product will be mis-identified on the tally. But the greater evil—charging the consumer for two items when only one is presented—is avoided.

In a related scenario, if a first watermarked GTIN is decoded and, two or three frames later, a different watermarked GTIN is decoded, a different case of proximate but conflicting GTINs has arisen. The first one will appear on the checkout tally, but not the second. And both will then be added to the blacklist.

The time or frame count interval that defines "proximate" decodings is restarted each time a watermark or barcode decoder finds a GTIN. (Commonly, in a swipe of a package past the camera system, a watermarked GTIN will be decoded from each of the frames in which the package is in view, e.g., 4-10.) The threshold interval (e.g., of frames or time) must thus elapse without any GTIN detection before the process resets. Until the process resets, any decoding of a different GTIN—whether from a barcode or watermark—will cause the control logic not to report second and following GTINs to the point of sale system, and will cause the control logic to blacklist any watermarked GTINs that are involved.

To be clear, the blacklist only serves to disable reports of listed GTINs to the point of sale system when such GTINs are decoded from a watermark. If a blacklisted GTIN is decoded from a traditional barcode, the blacklist is not involved. (However, a GTIN decoded from a traditional barcode may not be reported to the point of sale system, if a different GTIN was previously reported within the threshold time interval or frame count.)

FIGS. 23A-C provide Python code detailing the above-described process. (DB refers to a watermark, and 1D refers to a traditional barcode.)

Periodically, the blacklist from each scanner is uploaded to a remote server. Each entry in the blacklist is stored with an associated time-stamp. If two (or more) scanners both report proximate but conflicting decodes involving watermarked GTINs A and B, then that product has likely been double-marked. Remedial steps can then be taken, to ensure that the packaging is corrected prior to the next press run.

Meanwhile, the product will remain on the blacklist of each scanner that has detected the double-marking, and will not be watermark-recognized. (In some embodiments, a common blacklist is maintained for all POS terminals in a store, or for all POS terminals of a particular store chain in a region, state, or nation.)

In some arrangements, watermarked GTINs may "age-off" the blacklist after a certain period has elapsed, such as a week (or month) after the proximate but conflicting detection. This helps address the situation in which a blacklist entry is caused not by a single product that has been marked with two different GTINs, but rather by a checker passing two items past the scanner in quick succession. In such case, watermark detection for the blacklisted product(s) resumes a week (or month) after the double-detection event. (If, in fact, a double-marked product is the culprit, it will be restored to the blacklist soon after aging-off, i.e., the next time the scanner again detects its two proximate but conflicting GTINs.)

As noted, the most likely scenario in which double-marking may occur is when a separation or printing plate for one product is mistakenly used when printing a brand-mate product (e.g., lemon soda and lime soda). A plate used to print a dish soap label would not be used to print a soda can.

In accordance with a different aspect of the technology, two proximate but conflicting watermarked GTINs are not added to the blacklist unless both indicate the same manufacturer. The GTIN numbering standard, developed by the GS1 trade group, includes a sub-field of the identifier that serves to indicate the manufacturer (the "Company Prefix"). If two detected watermarks are proximate and conflicting, and the GTIN encoded in the first indicates Hostess Brands, and the GTIN encoded in the second indicates McCormick & Co., then both decoded GTINs may be passed to the POS terminal, with neither added to the blacklist. In contrast, if both GTINs indicate Hostess Brands, then both GTINs are added to the blacklist, since this more likely indicates a double-marked package.

GS1 Company Prefixes are actually of variable length, commonly 6 to 10 digits. Given this variability, the first six digits of the Company Prefix fields of two watermark GTINs can be checked, and the GTINs are added to the blacklist only if these 6 digits of the Company Prefix field match.

In addition to the Company Prefix, GTIN identifiers also include a product code portion (an "Item Reference"). Within a particular company, these codes are often logically grouped based on product segments. Kraft Foods, for example, owns the brands Jell-O, Planters, Tang, Velveeta, and dozens of others. The Item Reference codes assigned to related products are commonly numerically near each other. Again, it is unlikely that a separation or printing plate used in production of packaging for Jell-O gelatin would be used in packaging for Planters nuts.

Thus, in accordance with another aspect of the technology, a pair of proximate but conflicting watermarked GTINs are not added to the blacklist unless their manufacturer codes match AND their product codes are within a threshold numeric distance of each other, e.g., 100 or 1000. By such arrangement, if watermarked GTINs are decoded, from a single frame, reporting detection of both a box of Jell-O gelatin and a can of Planters nuts, it is unlikely these GTINs would be added to the blacklist, because they are likely not numerically near enough. (In contrast, if the scanner reports proximate but conflicting watermarked GTINs indicating both cherry and strawberry variants of a Jell-O gelatin product, then these GTINs would almost certainly be numerically-close, and thus added to the blacklist.)

In yet another variant, if two proximate but conflicting watermarked GTINs are detected, and before the threshold interval elapses a traditional black and white barcode is also detected, the GTIN decoded from the barcode is compared against the two different watermarked GTINs. If either watermarked GTIN matches the barcoded GTIN, it is taken as the correct identifier for the product, and that GTIN is passed to the POS terminal and added to the checkout tally. In such case, only the odd GTIN, which doesn't match the barcode payload, is added to the blacklist.

The above-detailed methods to avoid double-charging a customer are related to the barcode-based methods to avoid double-charging a customer that are detailed in U.S. Pat. Nos. 5,365,048 and 6,698,658, and patent publication 20100123005. (These patent documents are incorporated herein by reference.) Thus, according to further aspects of the present technology, features of applicant's above-described arrangements (e.g., the blacklist, its management, etc.) can be incorporated into the arrangements detailed in these documents, and features detailed in these documents (e.g., tracking positions of barcode patterns located in first and second frames, and incorporation of a weighscale, etc.) can be included with applicant's above-described arrangements. Such combinations are expressly contemplated as part of applicant's present inventive work.

VI. OPERATING ENVIRONMENT

The algorithms detailed above can be implemented using a variety of different hardware structures, including a microprocessor, an ASIC (Application Specific Integrated Circuit) and an FPGA (Field Programmable Gate Array). Hybrids of such arrangements can also be employed, such as reconfigurable hardware, and ASIPs.

By microprocessor, Applicant means a particular structure, namely a multipurpose, clock-driven, integrated circuit that includes both integer and floating point arithmetic logic units (ALUs), control logic, a collection of registers, and scratchpad memory (aka cache memory), linked by fixed bus interconnects. The control logic fetches instruction codes from a memory (often external), and initiates a sequence of operations required for the ALUs to carry out the instruction code. The instruction codes are drawn from a limited vocabulary of instructions, which may be regarded as the microprocessor's native instruction set.

A particular implementation of the above-detailed processes on a microprocessor—such as the process of generating a heat map indicating the strength of a watermark across a label—involves first defining the sequence of algorithm operations in a high level computer language, such as MatLab or C++ (sometimes termed source code), and then using a commercially available compiler (such as the Intel C++ compiler) to generate machine code (i.e., instructions in the native instruction set, sometimes termed object code) from the source code. (Both the source code and the machine code are regarded as software instructions herein.) The process is then executed by instructing the microprocessor to execute the compiled code.

Many microprocessors are now amalgamations of several simpler microprocessors (termed "cores"). Such arrangements allow multiple operations to be executed in parallel. (Some elements—such as the bus structure and cache memory may be shared between the cores.)

Examples of microprocessor structures include the Intel Xeon, Atom and Core-I series of devices. They are attractive choices in many applications because they are off-the-shelf components. Implementation need not wait for custom design/fabrication.

Closely related to microprocessors are GPUs (Graphics Processing Units). GPUs are similar to microprocessors in that they include ALUs, control logic, registers, cache, and fixed bus interconnects. However, the native instruction sets of GPUs are commonly optimized for image/video processing tasks, such as moving large blocks of data to and from memory, and performing identical operations simultaneously on multiple sets of data (e.g., pixels or pixel blocks). Other specialized tasks, such as rotating and translating arrays of vertex data into different coordinate systems, and interpolation, are also generally supported. The leading vendors of GPU hardware include Nvidia, ATI/AMD, and Intel. As used herein, Applicant intends references to microprocessors to also encompass GPUs.

GPUs are attractive structural choices for execution of certain of the detailed algorithms, due to the nature of the data being processed, and the opportunities for parallelism.

While microprocessors can be reprogrammed, by suitable software, to perform a variety of different algorithms, ASICs cannot. While a particular Intel microprocessor might be programmed today to perform watermark strength evaluation, and programmed tomorrow to prepare a user's tax return, an ASIC structure does not have this flexibility. Rather, an ASIC is designed and fabricated to serve a dedicated task, or limited set of tasks. It is purpose-built.

An ASIC structure comprises an array of circuitry that is custom-designed to perform a particular function. There are two general classes: gate array (sometimes termed semi-custom), and full-custom. In the former, the hardware comprises a regular array of (typically) millions of digital logic gates (e.g., XOR and/or AND gates), fabricated in diffusion layers and spread across a silicon substrate. Metallization layers, defining a custom interconnect, are then applied—permanently linking certain of the gates in a fixed topology. (A consequence of this hardware structure is that many of the fabricated gates—commonly a majority—are typically left unused.)

In full-custom ASICs, however, the arrangement of gates is custom-designed to serve the intended purpose (e.g., to perform a specified algorithm). The custom design makes more efficient use of the available substrate space—allowing shorter signal paths and higher speed performance. Full-custom ASICs can also be fabricated to include analog components, and other circuits.

Generally speaking, ASIC-based implementations of the detailed algorithms offer higher performance, and consume less power, than implementations employing microprocessors. A drawback, however, is the significant time and expense required to design and fabricate circuitry that is tailor-made for one particular application.

An ASIC-based particular implementation of the above-detailed methods, e.g., for generating a heat map representation of watermark strength across a label, again begins by defining the sequence of algorithm operations in a source code, such as MatLab or C++. However, instead of compiling to the native instruction set of a multipurpose microprocessor, the source code is compiled to a "hardware description language," such as VHDL (an IEEE standard), using a compiler such as HDLCoder (available from MathWorks). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

A third hardware structure that can be used to execute the above-detailed algorithms is an FPGA. An FPGA is a cousin to the semi-custom gate array discussed above. However, instead of using metallization layers to define a fixed interconnect between a generic array of gates, the interconnect is defined by a network of switches that can be electrically configured (and reconfigured) to be either on or off. The configuration data is stored in, and read from, a memory (which may be external). By such arrangement, the linking of the logic gates—and thus the functionality of the circuit—can be changed at will, by loading different configuration instructions from the memory, which reconfigure how these interconnect switches are set.

FPGAs also differ from semi-custom gate arrays in that they commonly do not consist wholly of simple gates. Instead, FPGAs can include some logic elements configured to perform complex combinational functions. Also, memory elements (e.g., flip-flops, but more typically complete blocks of RAM memory) can be included.

Likewise with A/D and D/A converters. Again, the reconfigurable interconnect that characterizes FPGAs enables such additional elements to be incorporated at desired locations within a larger circuit.

Examples of FPGA structures include the Stratix FPGA from Altera (now Intel), and the Spartan FPGA from Xilinx.

As with the other hardware structures, implementation of each of the above-detailed algorithms begins by authoring the algorithm in a high level language. And, as with the ASIC implementation, the high level language is next compiled into VHDL. But then the interconnect configuration instructions are generated from the VHDL by a software tool specific to the family of FPGA being used (e.g., Stratix/Spartan).

Hybrids of the foregoing structures can also be used to perform the detailed algorithms. One structure employs a microprocessor that is integrated on a substrate as a component of an ASIC. Such arrangement is termed a System on a Chip (SOC). Similarly, a microprocessor can be among the elements available for reconfigurable-interconnection with other elements in an FPGA. Such arrangement may be termed a System on a Programmable Chip (SORC).

Another hybrid approach, termed "reconfigurable hardware" by the Applicant, employs one or more ASIC elements. However, certain aspects of the ASIC operation can be reconfigured by parameters stored in one or more memories. For example, a watermark calibration signal can be defined by parameters stored in a re-writable memory. By such arrangement, the same ASIC may be incorporated into two disparate devices, which employ different calibration signals. One may be a verification device for checking the strength of watermark-encoded product identifiers hidden in grocery item packaging—which looks for a calibration signal comprised of one particular constellation of spatial frequency signals. A second may be an age verification terminal (e.g., at a liquor store) for reading watermark-encoded birthdate information hidden in a driver's license—which looks for a calibration signal comprised of a second, different constellation of spatial frequency signals. The chips are all identically produced in a single semiconductor fab, but are differentiated in their end-use by different calibration signal data stored in memory (which may be on-chip or off).

Yet another hybrid approach employs application-specific instruction set processors (ASIPS). ASIPS can be thought of as microprocessors. However, instead of having multi-purpose native instruction sets, the instruction set is tailored—in the design stage, prior to fabrication—to a particular intended use. Thus, an ASIP may be designed to include native instructions that serve operations associated with some or all of: oct-axis computation, FFTs, etc. However, such native instruction set would lack certain of the instructions available in more general purpose microprocessors.

Reconfigurable hardware and ASIP arrangements are further detailed in application Ser. No. 14/842,575, filed Sep. 1, 2015, the disclosure of which is incorporated herein by reference.

Software instructions for implementing the detailed functionality can be authored by artisans without undue experimentation from the descriptions provided herein, e.g., written in C, C++, MatLab, Visual Basic, Java, Python, Tcl, Perl, Scheme, Ruby, etc., and assembled in executable binary files, in conjunction with associated data. Firmware may be embodied as code, instructions or instruction sets or data that are hard-coded (e.g., nonvolatile) in memory devices.

Software and hardware configuration data/instructions are commonly stored as instructions in one or more data structures conveyed by tangible media, such as magnetic or optical discs, memory cards, ROM, etc., which may be accessed across a network.

Different of the functionality can be implemented on different devices. Thus, it should be understood that description of an operation as being performed by a particular device (e.g., a point of sale scanner) is not limiting but exemplary; performance of the operation by another device (e.g., a cloud computer), or shared between devices, is also expressly contemplated.

In like fashion, description of data being stored on a particular device is also exemplary; data can be stored anywhere: local device, remote device, in the cloud, distributed, etc.

The components and operations of the various described embodiments can be implemented in modules. Notwithstanding any specific discussion of the embodiments set forth herein, the term "module" may refer to software, firmware, circuitry, and/or any of the above-noted structures, configured to perform any of the methods, processes, functions or operations described herein.

Figure 8:
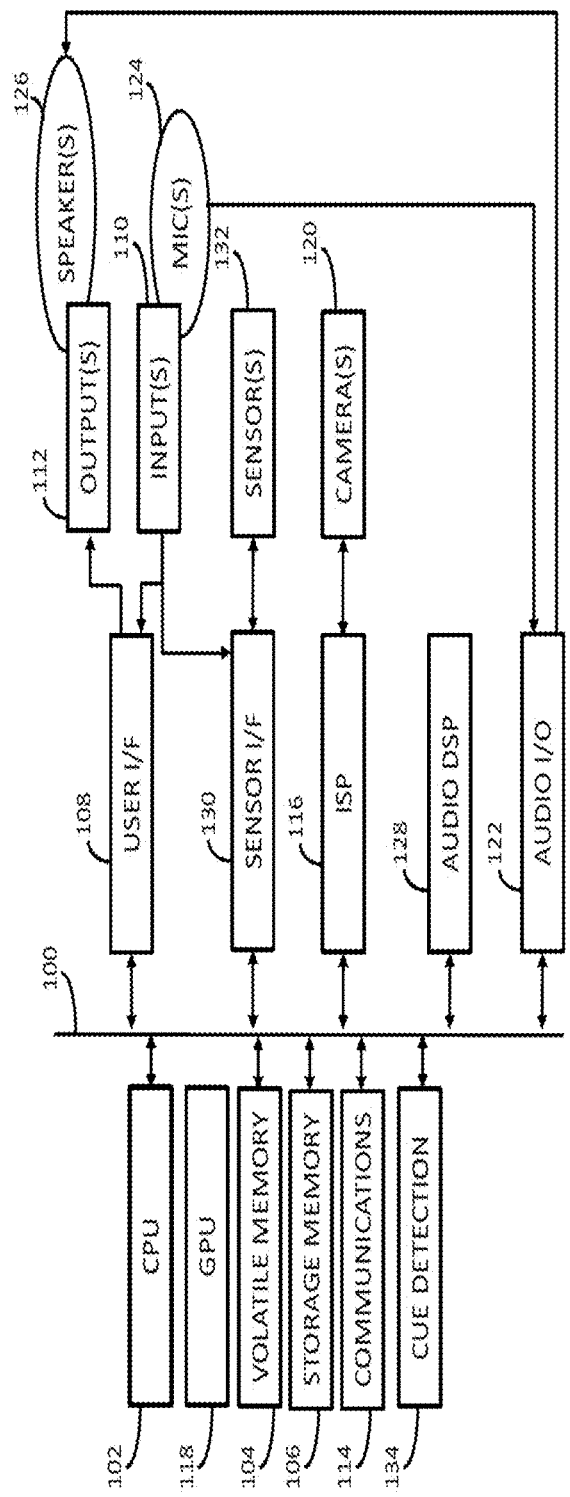
FIG. 8 is a diagram of an electronic device (e.g., a smartphone, mobile device, tablet, laptop or other electronic device).

FIG. 8 shows one illustrative embodiment, but should not be taken as limiting the scope of the technology.

FIG. 8 shows a system including a bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 8 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, multi-core microprocessor, parallel processors, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). Another CPU example is an Apple A8, A9 or A10. The A8 is built on a 64-bit architecture, includes a motion co-processor and is manufactured on a 20 nm process. The CPU 102 runs an operating system of the electronic device, runs application programs (e.g., designed to include the watermark-related functions described above) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. (The watermark-related functions may be integrated into the operating system itself.)

The system may also include a volatile memory 104 electrically coupled to bus 100. The volatile memory 104 may include, for example, any type of random access memory (RAM). Although not shown, the system may further include a memory controller that controls the flow of data to and from the volatile memory 104.

The system may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. The storage memory 106 may be used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof.

Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like.

Examples of software components include device drivers, software CODECs, message queues or mailboxes, databases, etc. A software component can also include any other data or parameter to be provided to application software, a web application, or the like or any combination thereof. Examples of data files include image files, text files, and the like.

Also connected to the bus 100 is a user interface module 108. The user interface module 108 is configured to facilitate user control of the system. Thus the user interface module 108 may be communicatively coupled to one or more user input devices 110 of known varieties. The user interface module 108 may also be configured to indicate, to the user, the effect of the user's control of the system, or any other information related to an operation being performed by the system or function otherwise supported by the system. Thus the user interface module 108 may also be communicatively coupled to one or more user output devices 112. A user output device 112 can, for example, include a display, such as a liquid crystal display (LCD), a light emitting diode (LED) display, an active-matrix organic light-emitting diode (AMOLED) display, an e-ink display, etc.

Generally, the user input devices 110 and user output devices 112 are an integral part of the system; however, in alternate embodiments, any user input device 110 (e.g., a microphone, etc.) or user output device 112 (e.g., a loud speaker, display, or printer) may be a physically separate device that is communicatively coupled to the electronic device (e.g., via a communications module 114). A printer encompasses many different devices for applying our encoded signals to objects, such as 2D and 3D printers, etching, engraving, flexo-printing, offset printing, embossing, laser marking, etc. The printer may also include a digital press such as HP's Indigo press. An encoded object may include, e.g., a consumer packaged product, a label, a sticker, a logo, a driver's license, a passport or other identification document, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, scanners, or by any other image sensors, thereby generating image data. Functions typically performed by the ISP 116 can include Bayer transformation, demosaicing, noise reduction, image sharpening, filtering, or the like or any combination thereof. The GPU 118 can be configured to process the image data generated by the ISP 116, thereby generating processed image data. Functions typically performed by the GPU 118 include compressing image data (e.g., into a JPEG format, an MPEG format, or the like or any combination thereof), rendering 3D graphics, texture mapping, calculating geometric transformations (e.g., rotation, translation, etc.) into different coordinate systems, etc. and sending the processed data to other components of the system (e.g., the volatile memory 104) via bus 100. Image data generated by the ISP 116 or processed image data generated by the GPU 118 may be accessed by the user interface module 108, where it is converted into one or more suitable signals that may be sent to a user output device 112 such as a display or printer. GPU 118 may also be configured to serve one or more functions of a watermark detector.

The communications module 114 includes circuitry, antennas, sensors, and any other suitable or desired technology that facilitates transmitting or receiving data (e.g., within a network) through one or more wired links (e.g., via Ethernet, USB, FireWire, etc.), or via one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G, 4G, 5G or LTE, Li-Fi (e.g., for IR- or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Further information on the FIG. 8 arrangement can be found in parent application Ser. No. 15/154,572, filed Mar. 13, 2016, which has previously been incorporated herein by reference.

VII. CONCLUDING REMARKS

This specification has discussed several different arrangements. It should be understood that the methods, elements and features detailed in connection with one arrangement can be combined with the methods, elements and features detailed in connection with other arrangements. While some such arrangements have been particularly described, many have not—due to the large number of permutations and combinations.

Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of Applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, Applicant incorporates-by-reference each of the documents referenced herein. (Such materials are incorporated in their entireties, even if cited above in connection with specific of their teachings.) These references disclose technologies and teachings that Applicant intends be incorporated into the arrangements detailed herein, and into which the technologies and teachings presently-detailed be incorporated.

What is claimed is:

1. A method employing a camera system associated with a point of sale terminal, the method comprising the acts:

providing image data, captured by the camera system, to a steganographic digital watermark decoder, the image data depicting at least one physical product package;

receiving, from the watermark decoder, first and second decoded payload data, respectively indicating detection of first and second different physical products; and adding said first and second decoded payload data to a data blacklist, the data blacklist indicating products that should not be tallied by the point of sale terminal;

wherein packages that are erroneously marked with two different steganographic watermarks are not tallied as two different products by the point of sale terminal, and customers are not erroneously charged for two products as a result.

2. The method of claim 1 in which the first and second decoded payload data comprise first and second GTIN identifiers corresponding to said first and second different physical products, each GTIN identifier having a manufacturing code portion, the method including:

checking a manufacturing code portion of the first GTIN identifier against a manufacturing code portion of the second GTIN identifier, to determine whether a match is found; and adding said first and second GTIN identifiers to the blacklist, only if said match is found, and otherwise not adding said first and second GTIN identifiers to the blacklist.

3. The method of claim 1 in which the first and second decoded payload data comprise first and second GTIN identifiers corresponding to said first and second different physical products, each GTIN identifier having a product code portion, the method including:

determining a difference between a product code portion of the first GTIN identifier and a product code portion of the second GTIN identifier, to determine a difference therebetween; and adding said first and second GTIN identifiers to the blacklist, only if said difference is less than a threshold value.

4. The method of claim 1 that further includes the acts:

providing second image data, captured by the camera system, to the decoder;

receiving, from the decoder, further payload data decoded from the second image data;

checking to determine whether said further payload data is included in said blacklist of data; and if the further payload data is included in said blacklist of data, not providing the further payload data to the point of sale terminal.

5. The method of claim 1 that further includes removing the first and second decoded payload data from the data blacklist after a period of time has elapsed since their addition to the data blacklist, wherein the first and second decoded payload data age-off the blacklist, thereby addressing a situation in which a single product was not marked with two different payloads, but rather a person presented two different items to the camera system in quick succession.

6. The method of claim 1 that further includes sharing said data blacklist with plural different point of sale terminals in a store.

7. The method of claim 1 that further involves a second camera system associated with a second point of sale terminal, the method further including:

providing a second frame of image data, captured by said second camera system, to a steganographic digital watermark decoder associated with the second point of sale terminal, the second frame of image data depicting at least one physical product package;

receiving, from the second watermark decoder, said first and second decoded payload data, respectively indicating detection of said first and second different physical products by the second point of sale terminal; and noting that multiple point of sale terminals decoded the same first and second payload data from captured imagery, indicating that a single product has likely been erroneously-marked with two different payloads.

8. The method of claim 1 in which the first image data comprises plural sequential frames of image data.

9. The method of claim 1 that includes passing neither of said first and second decoded payload data to a checkout tally for a customer associated with said image data.

10. A method comprising the acts:

providing a first frame of image data, captured by a camera system, to a steganographic digital watermark decoder, the first frame of image data depicting packaging for at least one physical product;

receiving, from the watermark decoder, first and second decoded payload data, respectively indicating detection of first and second different physical products; and adding said first and second decoded payload data to a data blacklist, the data blacklist indicating products that should not be tallied by a point of sale terminal;

wherein packages that are erroneously marked with two different steganographic watermarks are not tallied as two different products by the point of sale terminal, and customers are not erroneously charged for two products as a result.

11. A system that checks product packaging for mistaken double markings, the system including a camera, a processor and a memory, the memory containing instructions configuring the system to perform acts including: providing a first frame of image data, captured by a single camera, to a steganographic digital watermark decoder; receiving, from the watermark decoder, first and second decoded payload data, indicating that product packaging depicted in the first frame of image data includes two different digital watermark indicia; and flagging said product packaging as possibly doubly-marked by adding the first and second decoded payload data to a data blacklist; wherein said instructions configure the system to check a single frame to image data depicting product packaging, captured by a single camera, for mistaken double markings of steganographic digital watermarks.

12. The system of claim 11 that further includes taking remedial action to ensure that customers are not erroneously charged for two different products on account of double-marking.

13. A point of sale system according to claim 11.

14. The system of claim 11 in which the remedial action comprises passing neither of said and second decoded payload data to a checkout tally for a customer associated with said image data.

15. The system of claim 11 in which the first and second decoded payload data comprise first and second GTIN identifiers corresponding to said first and second different physical products, each GTIN identifier having a manufacturing code portion, and in which said instructions further configure the system to perform acts including: checking a manufacturing code portion of the first GTIN identifier against a manufacturing code portion of the second GTIN identifier, to determine whether a match is found; and adding said first and second GTIN identifiers to the blacklist only if said match is found, and otherwise not adding said first and second GTIN identifiers to the blacklist.

16. The system of claim 11 in which the first and second decoded payload data comprise first and second GTIN identifiers corresponding to said first and second different physical products, each GTIN identifier having a product code portion, and in which said instructions further configure the system to perform acts including: determining a difference between a product code portion of the first GTIN identifier and a product code portion of the second GTIN identifier, to determine a difference there between; and adding said first and second GTIN identifiers to the blacklist only if said difference is less than a threshold value.

17. The system of claim 11, in which said instructions further configure the system to perform acts including: providing a second frame of second image data, captured by the camera system, to the decoder; receiving, from the decoder, further payload data decoded from the second image data; checking to determine whether said further payload data is included in said blacklist of data; and if the further payload data is included in said blacklist of data, not adding a product indicated by said further payload data to a customer's checkout tally.

18. The system of claim 11 in which instructions further configure the system to perform acts including: removing the first and second decoded payload data from the data blacklist after a predetermined period of time has elapsed since their addition to the data blacklist, wherein the first and second decoded payload data age-off the blacklist, thereby addressing a situation in which a single product was not marked with two different payloads, but rather a person presented two different items to the camera system in quick succession.

* * * * *

UNITED STATES PATENT AND TRADEMARK OFFICE
CERTIFICATE OF CORRECTION

PATENT NO. : 10,929,943 B2  
APPLICATION NO. : 16/264413  
DATED : February 23, 2021  
INVENTOR(S) : Scott M. Long Page 1 of 1

It is certified that error appears in the above-identified patent and that said Letters Patent is hereby corrected as shown below:

In the Claims

Column 46, Claim 11, Line 34, after "including:", insert --¶--.
Column 46, Claim 11, Line 36, after "decoder;", insert --¶--.
Column 46, Claim 11, Line 40, after "and", insert --¶--.
Column 46, Claim 11, Line 42, after "blacklist;", insert --¶--.
Column 46, Claim 11, Line 43, delete "to image" and insert --of image--.
Column 46, Claim 14, Line 53, after "said", insert --first--.
Column 46, Claim 15, Line 61, after "including:", insert --¶--.
Column 46, Claim 15, Line 64, after "and", insert --¶--.
Column 47, Claim 16, Line 6, after "including:", insert --¶--.
Column 47, Claim 16, Line 9, delete "there between; and", insert --therebetween; and¶--.
Column 47, Claim 17, Line 12, delete "claim 11," insert --claim 11--.
Column 47, Claim 17, Line 13, after "including:", insert --¶--.
Column 47, Claim 17, Line 15, after "decoder;", insert --¶--.
Column 47, Claim 17, Line 17, after "data;", insert --¶--.
Column 47, Claim 17, Line 18, after "and", insert --¶--.
Column 47, Claim 18, Line 23, after "including:", insert --¶--.

Signed and Sealed this  
First Day of June, 2021

Drew Hirshfeld  
*Performing the Functions and Duties of the*  
*Under Secretary of Commerce for Intellectual Property and*  
*Director of the United States Patent and Trademark Office*